(12) United States Patent
Dinan et al.

(10) Patent No.: US 11,265,819 B2
(45) Date of Patent: *Mar. 1, 2022

(54) ADJUSTING A TRANSMISSION POWER BASED ON A PREAMBLE POWER PRIORITY IN A WIRELESS DEVICE

(71) Applicant: Ofinno, LLC, Reston, VA (US)

(72) Inventors: Esmael Hejazi Dinan, McLean, VA (US); Alireza Babaei, Fairfax, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/128,316

(22) Filed: Dec. 21, 2020

(65) Prior Publication Data

US 2021/0112501 A1 Apr. 15, 2021

Related U.S. Application Data

(63) Continuation of application No. 15/933,845, filed on Mar. 23, 2018, now Pat. No. 10,873,911.

(60) Provisional application No. 62/475,479, filed on Mar. 23, 2017.

(51) Int. Cl.
| | |
|---|---|
| *H04W 52/14* | (2009.01) |
| *H04W 74/08* | (2009.01) |
| *H04W 72/04* | (2009.01) |
| *H04W 52/36* | (2009.01) |
| *H04W 52/28* | (2009.01) |

(52) U.S. Cl.
CPC ....... *H04W 52/146* (2013.01); *H04W 52/281* (2013.01); *H04W 52/367* (2013.01); *H04W 72/0413* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 10,098,077 B2 | 10/2018 | Xu | |
| 2006/0280145 A1* | 12/2006 | Revel | H04W 72/1278 370/331 |
| 2010/0296464 A1* | 11/2010 | Barraclough | H04W 28/06 370/329 |
| 2011/0171989 A1* | 7/2011 | Kim | H04L 5/0055 455/522 |

(Continued)

OTHER PUBLICATIONS

3GPP TS 36.211 V14.1.0 (Dec. 2016); 3rd Generation Partnership Project; Technical Specification Group Radio Access Network; Evolved Universal Terrestrial Radio Access (E-UTRA); Physical channels and modulation (Release 14).

(Continued)

*Primary Examiner* — Kodzovi Acolatse
(74) *Attorney, Agent, or Firm* — Nixon & Vanderhye P.C.

(57) ABSTRACT

A wireless device receives a grant indicating radio resources for transmission of a transport block via a first cell. The radio resources overlap in time with a configured transmission of a preamble via a second cell. a transmission power of one of the preamble or the transport block is adjusted based on a power priority of the preamble. The power priority of the preamble is: higher than a power priority of the transport block based on the second cell being a primary cell; and lower than the power priority of the transport block based on the second cell being a secondary cell. The transport block is transmitted via the radio resources.

20 Claims, 19 Drawing Sheets

(56) References Cited

U.S. PATENT DOCUMENTS

| | | | |
|---|---|---|---|
| 2012/0057547 A1* | 3/2012 | Lohr | H04L 5/0064 370/329 |
| 2013/0114445 A1* | 5/2013 | Wen | H04W 24/10 370/252 |
| 2014/0056271 A1 | 2/2014 | Ahn | |
| 2014/0133449 A1* | 5/2014 | Xu | H04W 52/367 370/329 |
| 2015/0282102 A1 | 10/2015 | Kakishima | |
| 2016/0100434 A1* | 4/2016 | Chen | H04W 52/50 370/329 |
| 2017/0013565 A1* | 1/2017 | Pelletier | H04W 52/365 |
| 2018/0132197 A1* | 5/2018 | Lin | H04W 52/365 |
| 2018/0270839 A1* | 9/2018 | Loehr | H04W 72/14 |
| 2019/0044639 A1* | 2/2019 | Ouchi | H04W 52/34 |
| 2019/0312704 A1 | 10/2019 | Rico Alvarino | |

OTHER PUBLICATIONS

3GPP TS 36.212 V14.1.0 (Dec. 2016); 3rd Generation Partnership Project; Technical Specification Group Radio Access Network; Evolved Universal Terrestrial Radio Access (E-UTRA); Multiplexing and channel coding (Release 14).

3GPP TS 36.213 V14.1.0 (Dec. 2016); 3rd Generation Partnership Project; Technical Specification Group Radio Access Network; Evolved Universal Terrestrial Radio Access (E-UTRA); Physical layer procedures (Release 14).

3GPP TS 36.300 V14.1.0 (Dec. 2016); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14).

3GPP TS 36.321 V14.1.0 (Dec. 2016); 3rd Generation Partnership Project; Technical Specification Group Radio Access Network; Evolved Universal Terrestrial Radio Access (E-UTRA); Medium Access Control (MAC) protocol specification (Release 14).

3GPP TS 36.331; V14.1.0 (Dec. 2016)3rd Generation Partnership Project; Technical Specification Group Radio Access Network; Evolved Universal Terrestrial Radio Access (E-UTRA); Radio Resource Control (RRC); Protocol specification (Release 14).

R1-1700063; 3GPP TSG RAN WG1 NR Ad Hoc Meeting; Spokane, USA, Jan. 16-20, 2017; Agenda Item: 5.1.2.4; Source: Huawei, HiSilicon; Title: General discussion of UL power control for NR; Document for: Discussion and decision.

R1-1700358; 3GPP TSG RAN WG1 NR Ad-Hoc Meeting; Spokane, USA, Jan. 16-20, 2017; Source: Intel Corporation; Title: on Uplink Power Control; Agenda item: 5.1.2.4; Document for: Discussion and Decision.

R1-1700553; 3GPP TSG RAN WG1 NR-Adhoc; Spokane, USA, Jan. 16-20, 2017; Source: Guangdong OPPO Mobile Telecom; Title: Uplink power control for NR; Agenda Item: 5.1.2.4; Document for: Discussion and Decision.

R1-1700940; 3GPP TSG RAN WG1 NR Ad-Hoc Meeting; Spokane, USA Jan. 16-20, 2017; Agenda item 5.1.2.4; Source: Samsung; Title: UL Power Control Aspects; Document for: Discussion and Decision.

R1-1700963; 3GPP TSG RAN WG1 Ad-Hoc Meeting; Spokane, USA, Jan. 16-20, 2017; Agenda item: 5.1.3.5; Source: Samsung; Title: UL Power Control for CA with Different Numerologies; Document for: Discussion and Decision.

R1-1701109; 3GPP TSG RAN WG1 NR Ad-Hoc Meeting; Spokane, USA, Jan. 16-20, 2017; Agenda item: 5.1.2.4; Source: Nokia, Alcatel-Lucent Shanghai Bell; Title: Uplink Power Control for MIMO; Document for: Discussion and Decision.

R1-1701659; 3GPP TSG RAN WG1 Meeting #88; Athens, Greece, Feb. 13-17, 2017; Agenda Item: 8.1.10; Source: Huawei, HiSilicon; Title: Power control for CA and DC; Document for: Discussion and decision.

R1-1701687; 3GPP TSG RAN WG1 Meeting #88; Athens, Greece, Feb. 13-17, 2017; Agenda Item: 8.1.2.5; Source: Huawei, HiSilicon; Title: General discussion of UL power control for NR; Document for: Discussion and decision.

R1-1701688; 3GPP TSG RAN WG1 Meeting #88; Athens, Greece, Feb. 13-17, 2017; Agenda Item: 8.1.2.5; Source: Huawei, HiSilicon; Title: Detailed considerations on UL power control design for NR; Document for: Discussion and decision.

R1-1701947; 3GPP TSG RAN WG1 Meeting #88; Athens, Greece, Feb. 13-17, 2017; Source: Guangdong OPPO Mobile Telecom; Title: Uplink power control for NR; Agenda Item: 8.1.2.5 Document for: Discussion and Decision.

R1-1702216; 3GPP TSG-RAN WG1 #88; Athens, Greece, Feb. 13-17, 2017; Source: Intel Corporation; Title: On UL Power Control; Agenda item: 8 1.2.5; Document for: Discussion and Decision.

R1-1702468; 3GPP TSG RAN WG1 Meeting #88; Athens, Greece Feb. 13-17, 2017; Agenda Item: 8.1.2.5; Source: LG Electronics; Title: Discussion on uplink power control for NR; Document for: Discussion and decision.

R1-1702964; 3GPP TSG RAN WG1 Meeting #88; Athens, Greece Feb. 13-17, 2017; Agenda item: 8.1.2.5; Source: Samsung; Title: UL Power Control Aspects; Document for: Discussion and Decision.

R2-1 700049; 3GPP TSG-RAN WG2 NR Ad Hoc; Spokane, USA, Jan. 17-19, 2017; Agenda Item: 3.2.1.2; Source: OPPO; Title: Logical channel multiplexing and prioritization in NR; Document for: Discussion and Decision.

R2-1700083; 3GPP TSG-RAN2 Meeting #Ad hoc; Spokane, Washington, USA, Jan. 17-19, 2017; Agenda item: 3.2.1.2; Source: Huawei, HiSilicon; Title: MAC Support of Multiple Numerologies; Document for: Discussion and Decision.

R2-1700085; 3GPP TSG-RAN WG2 Ad Hoc; Spokane, USA, Jan. 17-19, 2017; Agenda item: 3.2.1.2; Source: Huawei, HiSilicon; Title: LCP with Multiple Numerologies; Document for: Discussion and Decision.

R2-1700198; 3GPP TSG-RAN WG2 NR Ad Hoc; Spokane, USA, Jan. 17-19, 2017; Source: CATT; Title: NR LCP procedure; Agenda Item: 3.2.1.2; Document for: Discussion and Decision.

R2-1700236; 3GPP TSG-RAN WG2 NR Ad Hoc; Spokane, Washington Jan. 17-19, 2017; Agenda Item: 3.2.1.2; Source: InterDigital Communications; Title: LCP and Scheduling Aspects for Multiple Numerologies; Document for: Discussion, Decision.

R2-1700252; 3GPP TSG-RAN WG2 NR Adhoc; Spokane, USA, Jan. 17-19, 2017; Agenda item: 3.2.1.4; Source: Nokia, Alcatel-Lucent Shanghai Bell; Title: Logical channel to numerologies/TTI length mapping; WID/SID: FS_NR_newRAT—Release 14; Document for: Discussion and Decision.

R2-1700285; 3GPP TSG-RAN WG2 NR Ad Hoc; Spokane, USA, Jan. 17-Jan. 19, 2017; Agenda item: 3.2.1.4 (FS_NR_newRAT); Source: LG Electronics Inc; Title: UL grant and MAC PDU construction; Document for: Discussion and Decision.

R2-1700296; 3GPP TSG-RAN WG2 NR AdHoc; Spokane, USA, Jan. 17-19, 2017; Agenda item: 3.2.1.2; Source: Samsung; Title: MAC Aspects to Support Multiple Service Verticals; Document for: Discussion and Decision.

R2-1700534; 3GPP TSG-RAN2#96 meeting; Reno, USA, Nov. 14-18, 2016; Agenda Item: 3.2.1.4; Souce: MediaTek Inc.; Title: Enhancements to logical channel prioritization; Document for: Discussion and decision.

R2-1700562; 3GPP TSG-RAN WG2 Meeting NR ad-hoc; Spokane, USA, Jan. 17-19, 2017; Agenda item: 3.2.1.2; Source: Qualcomm Incorporated; Title: Multiple numerologies—MAC aspects; WID/SID: FS_ NR_newRAT—Release 14; Document for: Discussion and Decision.

R2-1700601; 3GPP TSG RAN WG2 NR Ad-hoc; Spokane, USA, Jan. 17 to 19, 2017; Agenda Item: 3.2.1.2; Souce: Samsung; Title: Logical Channel Prioritization Considering Multiple; Numerologies and/or TTIs; Document for: Discussion/Decision.

R2-1700602; 3GPP TSG RAN WG2 NR Ad-hoc; Spokane, USA, Jan. 17 to 19, 2016; Agenda Item: 3.2.1.2; Souce: Samsung; Title: Mapping between Logical Channels and Numerologies and/or TTIs; Document for: Discussion/Decision.

(56) References Cited

OTHER PUBLICATIONS

R2-1700844; 3GPP TSG-RAN WG2 #97; Athens, Greece, Feb. 13-17, 2017; Agenda Item: 10.2.1.2; Source: Ericsson; Title: Further aspects on LCP; Document for: Discussion, Decision.

R2-1700960; 3GPP TSG-RAN2 #97; Athens, Greece, Feb. 13-17, 2017; Agenda Item: 10.2.1.4; Source: OPPO; Title: Discussion on scheduling enhancement; Document for: Discussion, Decision.

R2-1701185; 3GPP TSG-RAN WG2 #97; Athens, Greece, Feb. 13-17, 2017; Update to R2-1700236; Agenda Item: 10.2.1.4; Source: InterDigital Communications; Title: Logical Channel Prioritization with Multiple Numerologies for NR; Document for: Discussion, Decision.

R2-1701203; 3GPP TSG-RAN WG2 #97; Athens, Greece, Feb. 13-17, 2017; revision of R2-1700085; Agenda item: 10.2.1.2; Source: Huawei, HiSilicon; Title: LCP with Multiple Numerologies; Document for: Discussion and Decision.

R2-1701207; 3GPP TSG-RAN WG2 #97; Athens, Greece, Feb. 13-17, 2017; Revision of R2-1700175; Agenda item: 10.2.1.4; Source: Huawei, HiSilicon; Title: UL Scheduling Enhancement in NR; Document for: Discussion and decision.

R2-1701541; 3GPP TSG-RAN WG2 Meeting #97; Athens, Greece, Feb. 13-17, 2017; Agenda Item: 10.2.1.2 (FS_ NR_newRAT); Source: LG Electronics Inc.; Title: Numerology impact on LCP; Document for : Discussion and Decision.

R2-1701550; 3GPP TSG-RAN WG2 NR#97; Athens, Greece, Feb. 13-17, 2017; Revision of R2-1700296; Agenda item: 10.2.1.2; Source: Samsung; Title: MAC to Support Multiple Service Verticals and Numerologies Document for: Discussion and Decision.

R2-1701709; 3GPP TSG-RAN WG2 #97; Athens, Greece, Feb. 13-17, 2017; Agenda Item: 10.2.1.4; Souce: MediaTek Inc.; Title: Enhancements to logical channel prioritization; Document for: Discussion and decision.

R2-1701992; 3GPP TSG RAN WG2 #97; Athens, Greece, Feb. 13 to 17, 2017; Resubmission of R2-1700601; Agenda Item: 10.2.1.2; Souce: Samsung; Title: Logical Channel Prioritization Considering Multiple Numerologies and/or TTIs; Document for: Discussion/Decision.

R2-1701993; 3GPP TSG RAN WG2 #97; Athens, Greece, Feb. 13 to 17, 2017; Resubmission of R2-1700603; Agenda Item: 10.2.1.4; Souce: Samsung; Title: UL Scheduling Issues for Latency Reduction in NR; Document for: Discussion/Decision.

R2-17xxxxx; 3GPP TSG-RAN WG2 NR Adhoc Meeting; Agenda Item: 3.2.1.2; Source: III; Title: LCP procedure support of URLLC traffic in different numerologies; Document for: Discussion, Decision.

* cited by examiner

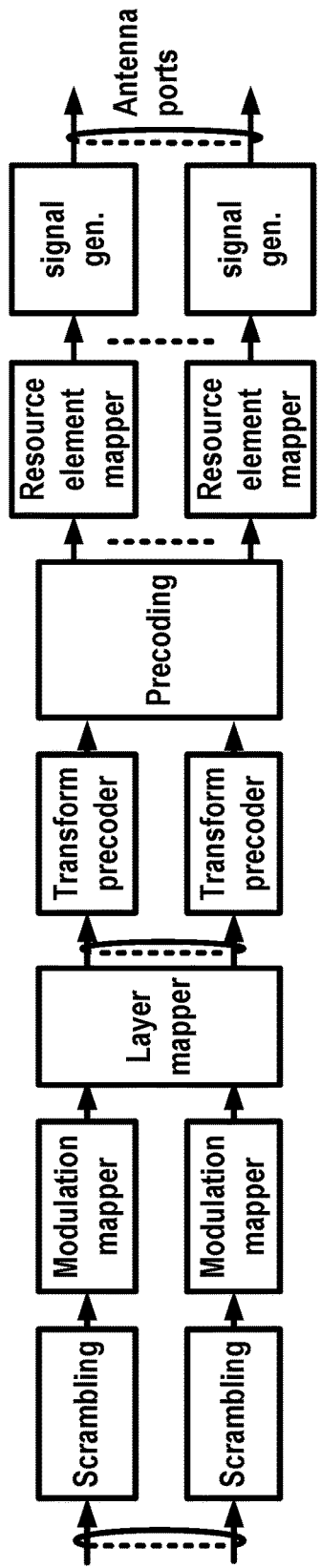
FIG. 4A
FIG. 4B
FIG. 4D
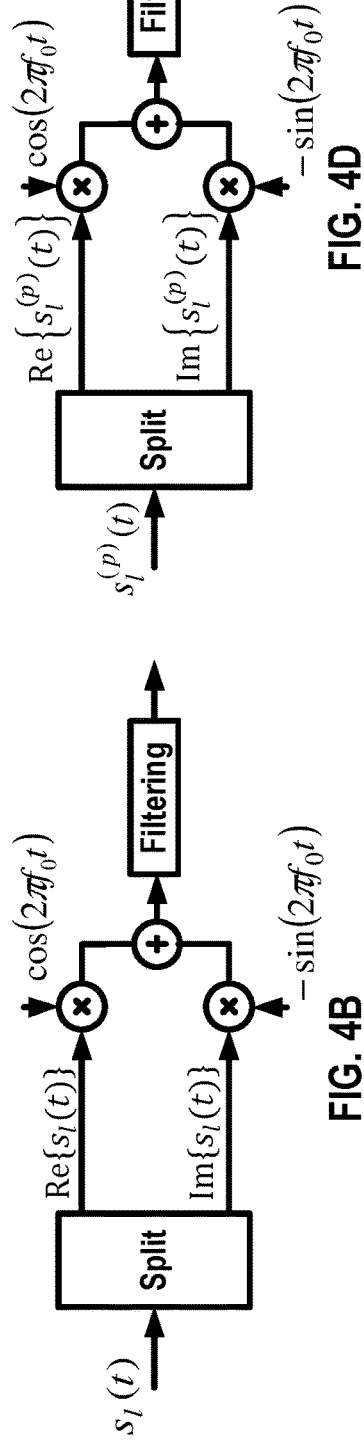
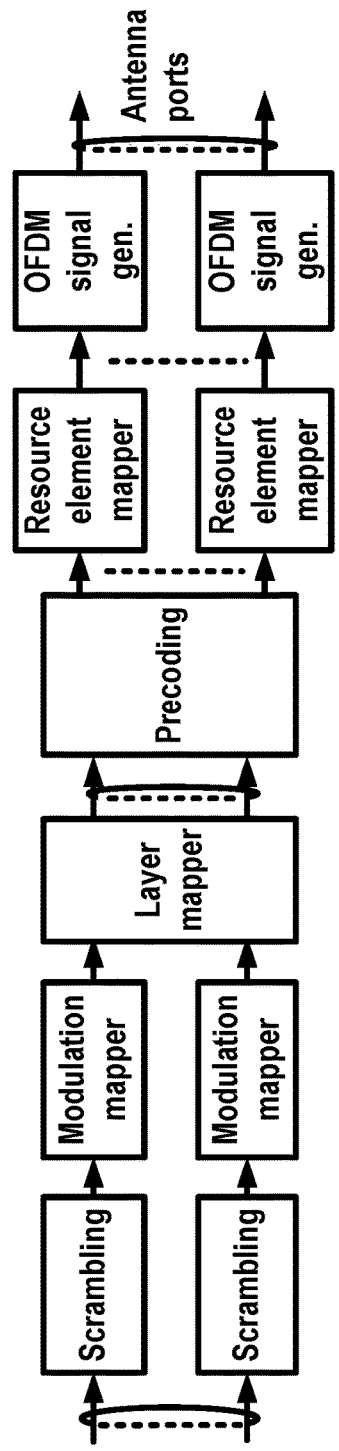
FIG. 4C

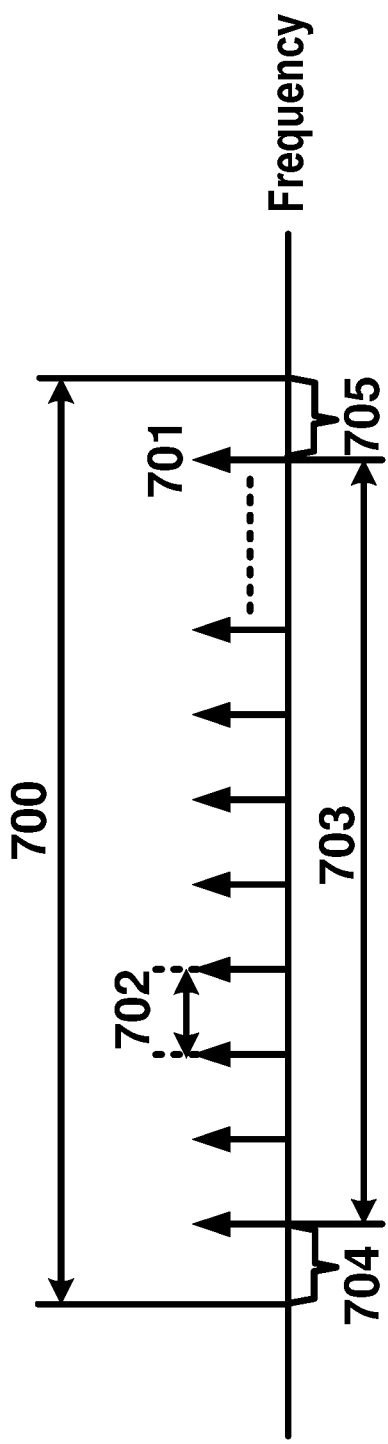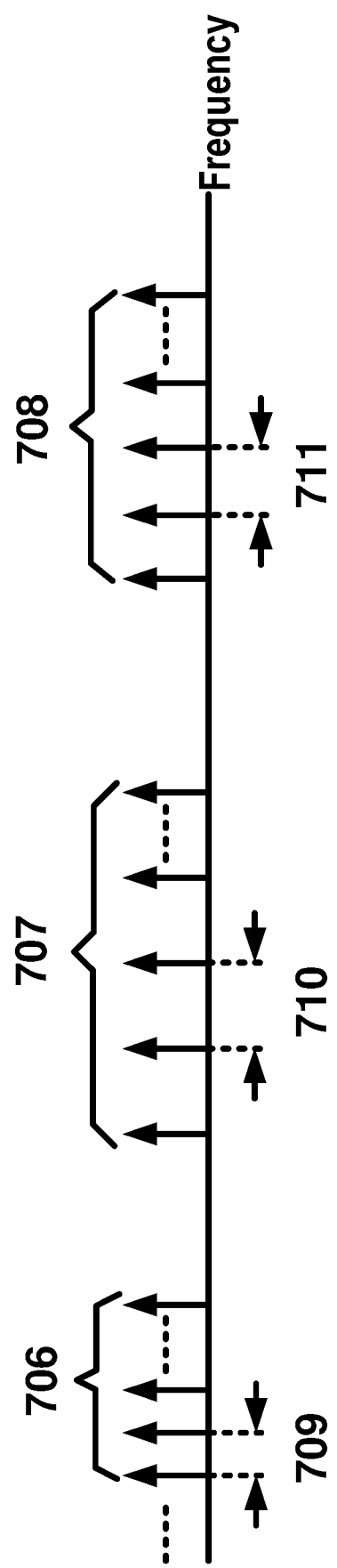

```
┌─────────────────────────────────────────────────────────┐
│  Receive, by a wireless device, message(s) comprising   │
│ configuration parameters for logical channel(s) comprising a first │
│  logical channel, where the configuration parameters indicate: a  │
│   first logical channel priority for the first logical channel; and a │
│   mapping of the first logical channel to transmission duration(s) │
│                         1810                            │
└─────────────────────────────────────────────────────────┘
                             │
                             ▼
┌─────────────────────────────────────────────────────────┐
│   Receive an uplink grant indicating radio resources associated │
│              with a first transmission duration          │
│                         1820                            │
└─────────────────────────────────────────────────────────┘
                             │
                             ▼
┌─────────────────────────────────────────────────────────┐
│  Multiplex data from the first logical channel into a first transport │
│   block in response to the first transmission duration being one of │
│                  the transmission duration(s)            │
│                         1830                            │
└─────────────────────────────────────────────────────────┘
                             │
                             ▼
┌─────────────────────────────────────────────────────────┐
│  Adjust a transmission power of the first transport block based on │
│  the first logical channel priority in response to a calculated total │
│          transmission power being above a first value    │
│                         1840                            │
└─────────────────────────────────────────────────────────┘
                             │
                             ▼
┌─────────────────────────────────────────────────────────┐
│    Transmit the first transport block via the radio resources │
│                         1850                            │
└─────────────────────────────────────────────────────────┘
```

FIG. 18

```
┌─────────────────────────────────────────────────────────────┐
│ Receive, by a wireless device, message(s) comprising        │
│ configuration parameters for logical channel(s) comprising  │
│ a first logical channel, where the configuration parameters │
│ indicate: a first logical channel priority for the first    │
│ logical channel; and a mapping of the first logical channel │
│ to transmission duration(s)                                 │
│ 1910                                                        │
└─────────────────────────────────────────────────────────────┘
                              │
                              ▼
┌─────────────────────────────────────────────────────────────┐
│ Receive an uplink grant indicating radio resources          │
│ associated with a first transmission duration               │
│ 1920                                                        │
└─────────────────────────────────────────────────────────────┘
                              │
                              ▼
┌─────────────────────────────────────────────────────────────┐
│ Multiplex data from the first logical channel into a first  │
│ transport block in response to the first transmission       │
│ duration being one of the transmission duration(s)          │
│ 1930                                                        │
└─────────────────────────────────────────────────────────────┘
                              │
                              ▼
┌─────────────────────────────────────────────────────────────┐
│ Drop a configured transmission of the first transport block │
│ based on the first logical channel priority in response to  │
│ a calculated total transmission power being above a first   │
│ value, where the calculated total transmission power is a   │
│ sum of a first calculated power level of the first          │
│ transport block and second calculated power levels of       │
│ signal(s)                                                   │
│ 1940                                                        │
└─────────────────────────────────────────────────────────────┘
                              │
                              ▼
┌─────────────────────────────────────────────────────────────┐
│ Transmit the signal(s)                                      │
│ 1950                                                        │
└─────────────────────────────────────────────────────────────┘
```

FIG. 19

ADJUSTING A TRANSMISSION POWER BASED ON A PREAMBLE POWER PRIORITY IN A WIRELESS DEVICE

CROSS-REFERENCE TO RELATED APPLICATIONS

This application is a continuation of U.S. application Ser. No. 15/933,845, filed Mar. 23, 2018, now U.S. patent Ser. No. 10/873,911, which claims the benefit of U.S. Provisional Application No. 62/475,479, filed Mar. 23, 2017, which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

FIG. 7A and FIG. 7B are diagrams depicting example sets of OFDM subcarriers as per an aspect of an embodiment of the present disclosure.

FIG. 18 is an example flow diagram as per an aspect of an embodiment of the present disclosure.

FIG. 19 is an example flow diagram as per an aspect of an embodiment of the present disclosure.

DETAILED DESCRIPTION OF EMBODIMENTS

Figure 1:
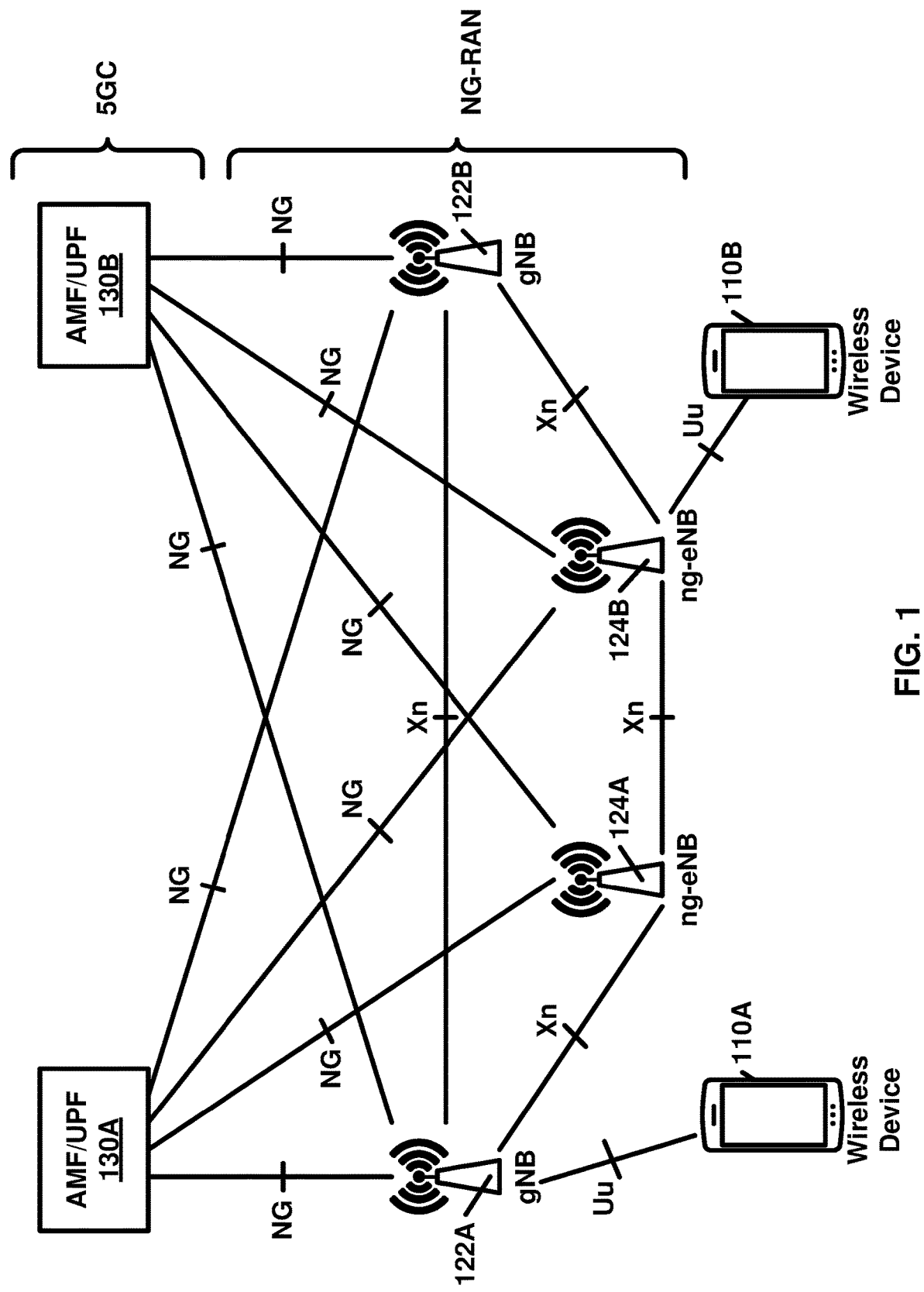
FIG. 1 is a diagram of an example RAN architecture as per an aspect of an embodiment of the present disclosure.

Example embodiments of the present disclosure enable operation of power adjustment. Embodiments of the technology disclosed herein may be employed in the technical field of multicarrier communication systems.

The following Acronyms are used throughout the present disclosure:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix—Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control CHannel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic CHannel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel IDentifier
LTE Long Term Evolution MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank Indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 124A, 124B), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface. In this disclosure, wireless device 110A and 110B are structurally similar to wireless device 110. Base stations 120A and/or 120B may be structurally similarly to base station 120. Base station 120 may comprise at least one of a gNB (e.g. 122A and/or 122B), ng-eNB (e.g. 124A and/or 124B), and or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, and dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide functions such as NG interface management, UE context management, UE mobility management, transport of NAS messages, paging, PDU session management, configuration transfer or warning message transmission.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
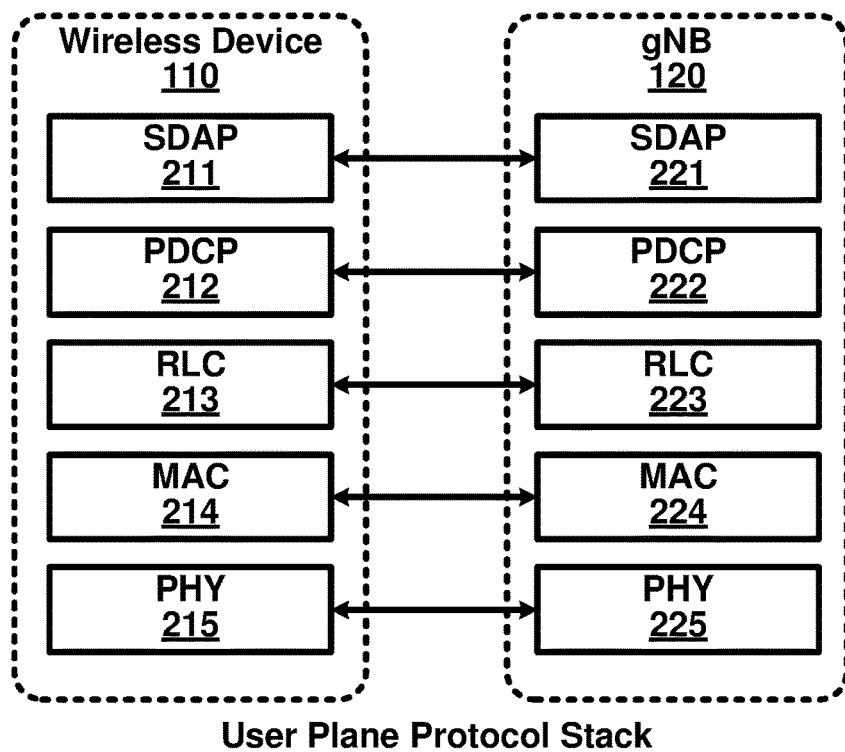
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
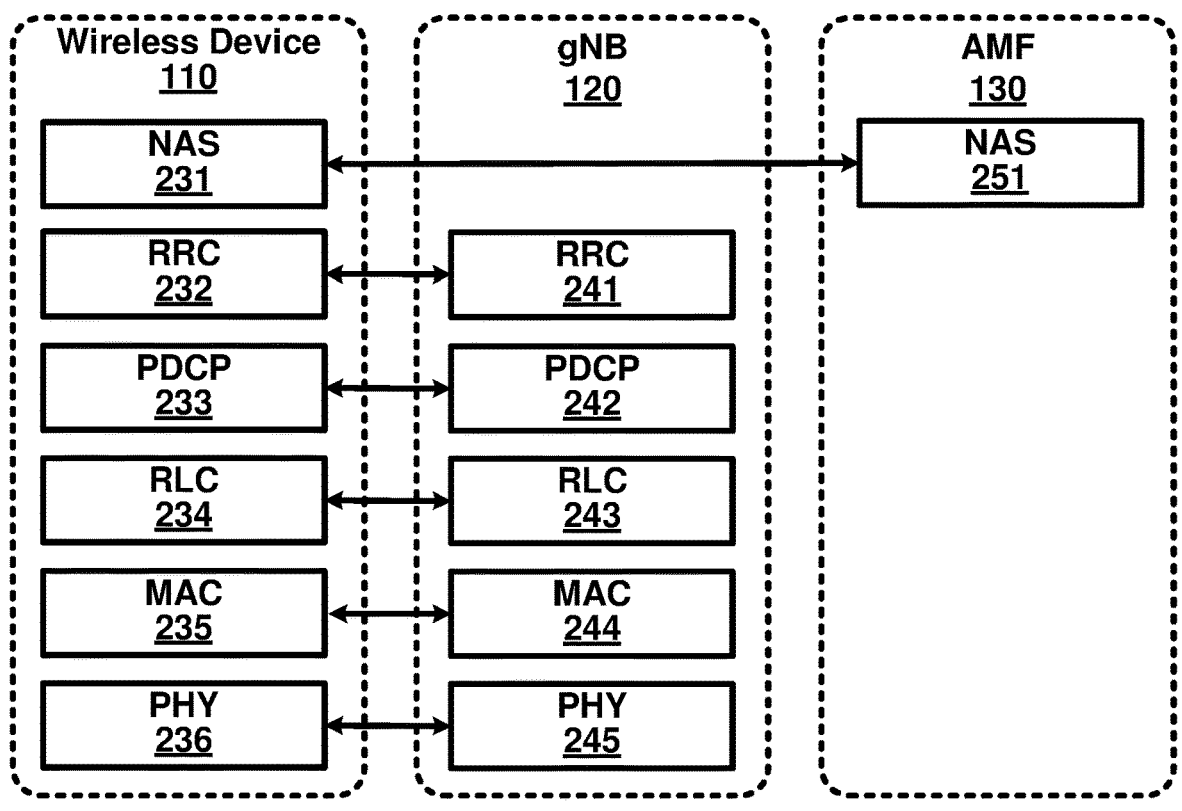
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
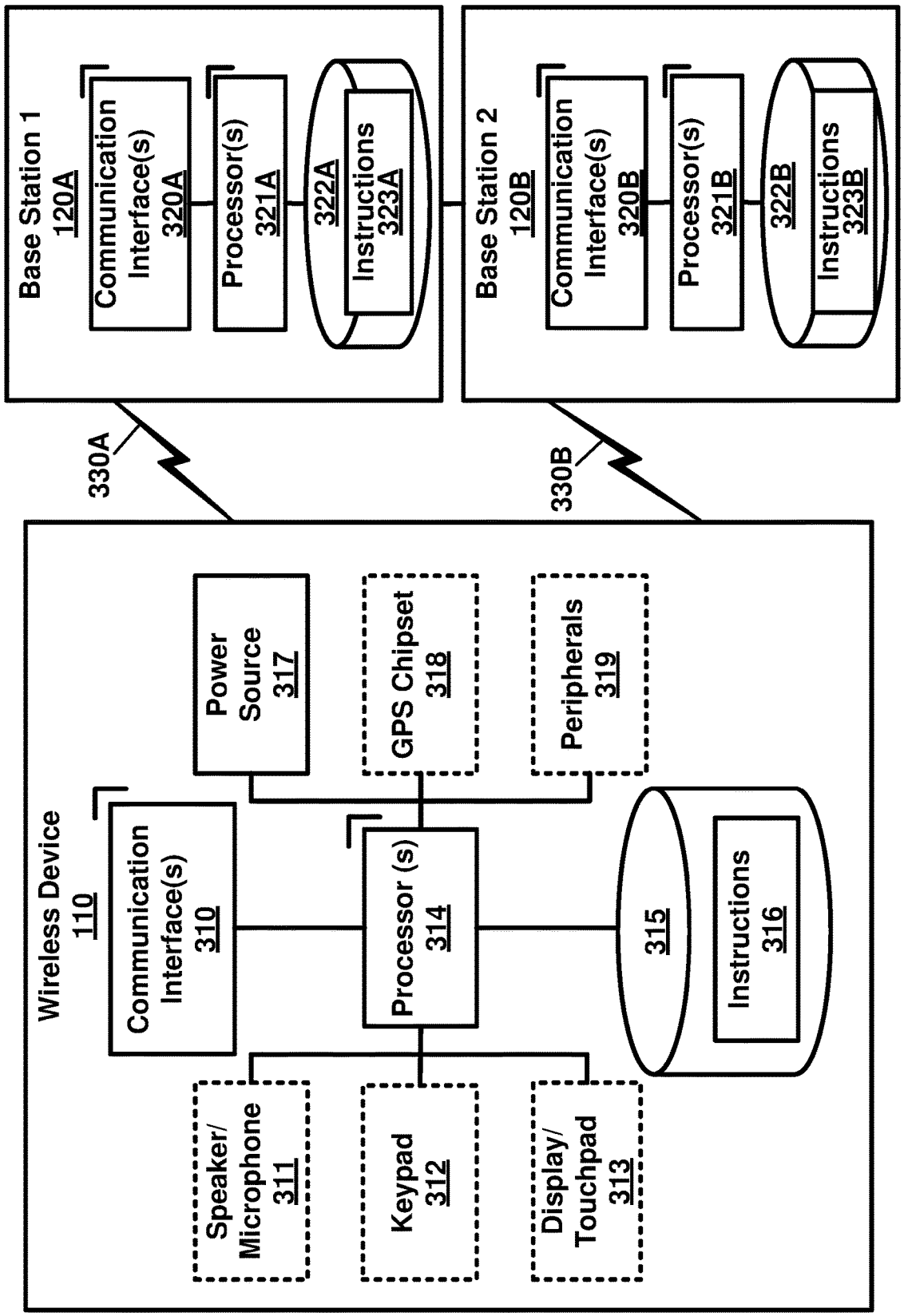
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
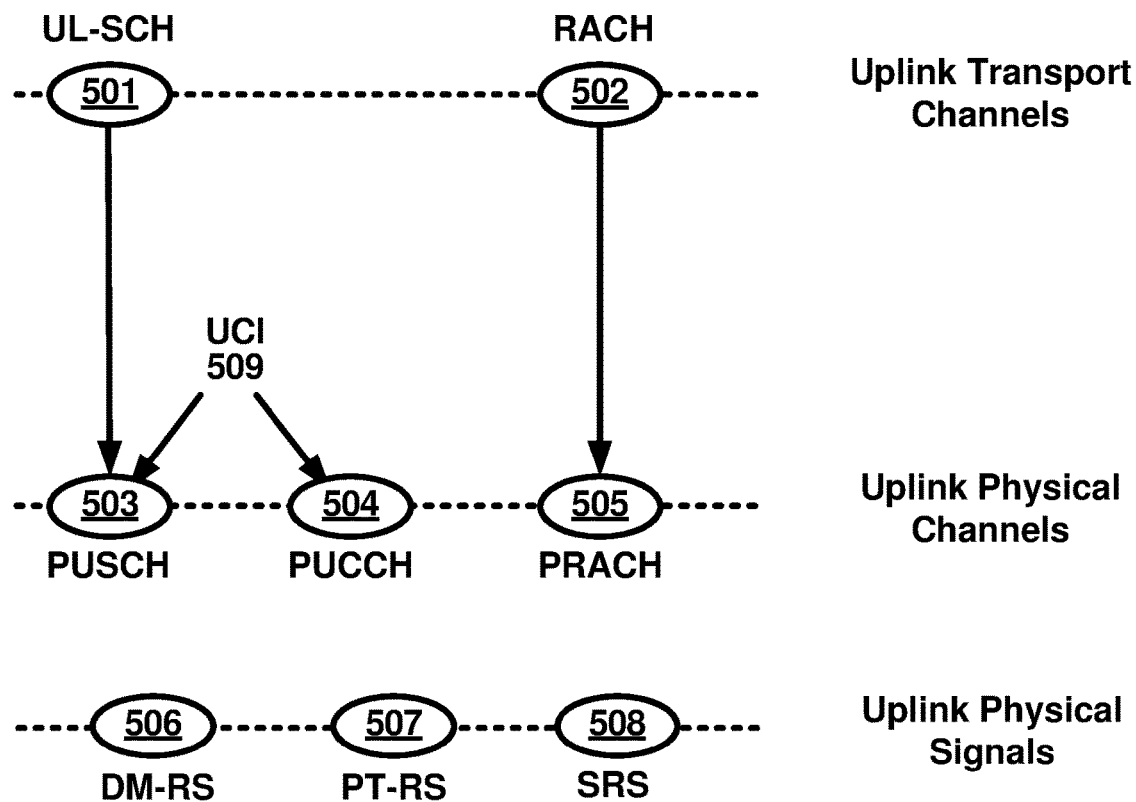
FIG. 5A is a diagram of an example uplink channel mapping and example uplink physical signals as per an aspect of an embodiment of the present disclosure.
Figure 5B:
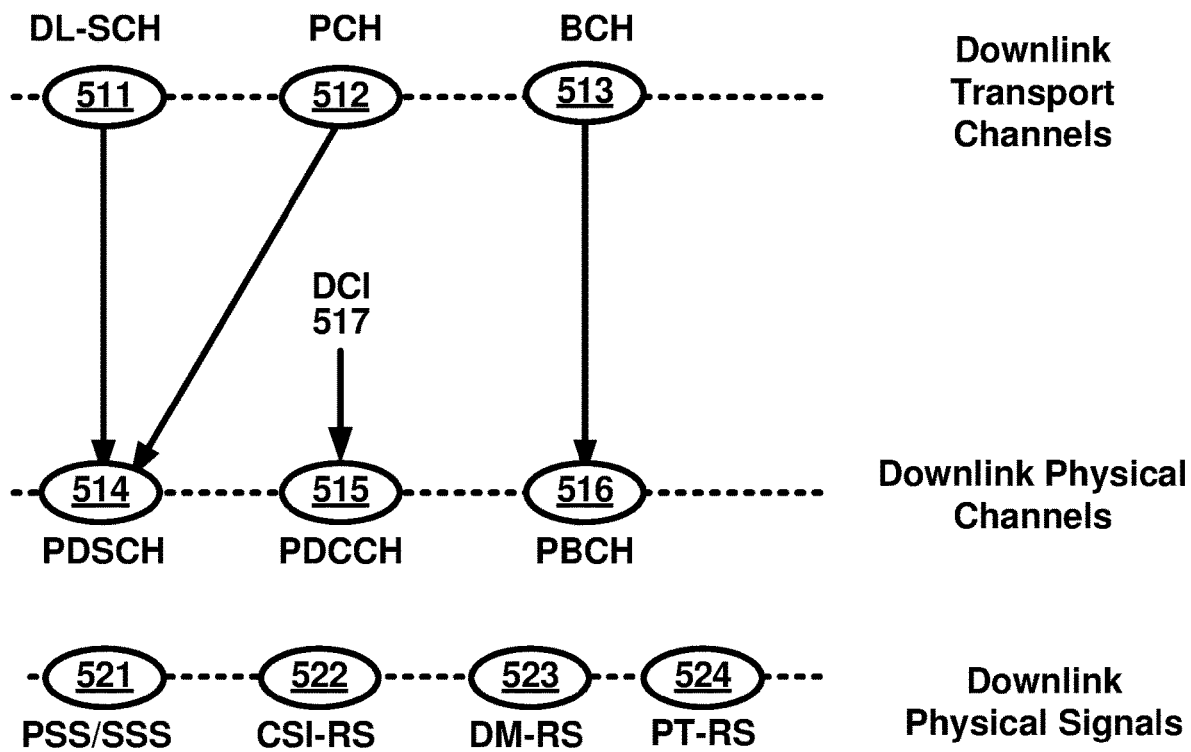
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping. for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ a same OFDM symbols for downlink CSI-RS 522 and SSB/PBCH when the downlink CSI-RS 522 and SSB/PBCH are spatially quasi co-located and resource elements associated with the downlink CSI-RS 522 are the outside of PRBs configured for SSB/PBCH.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
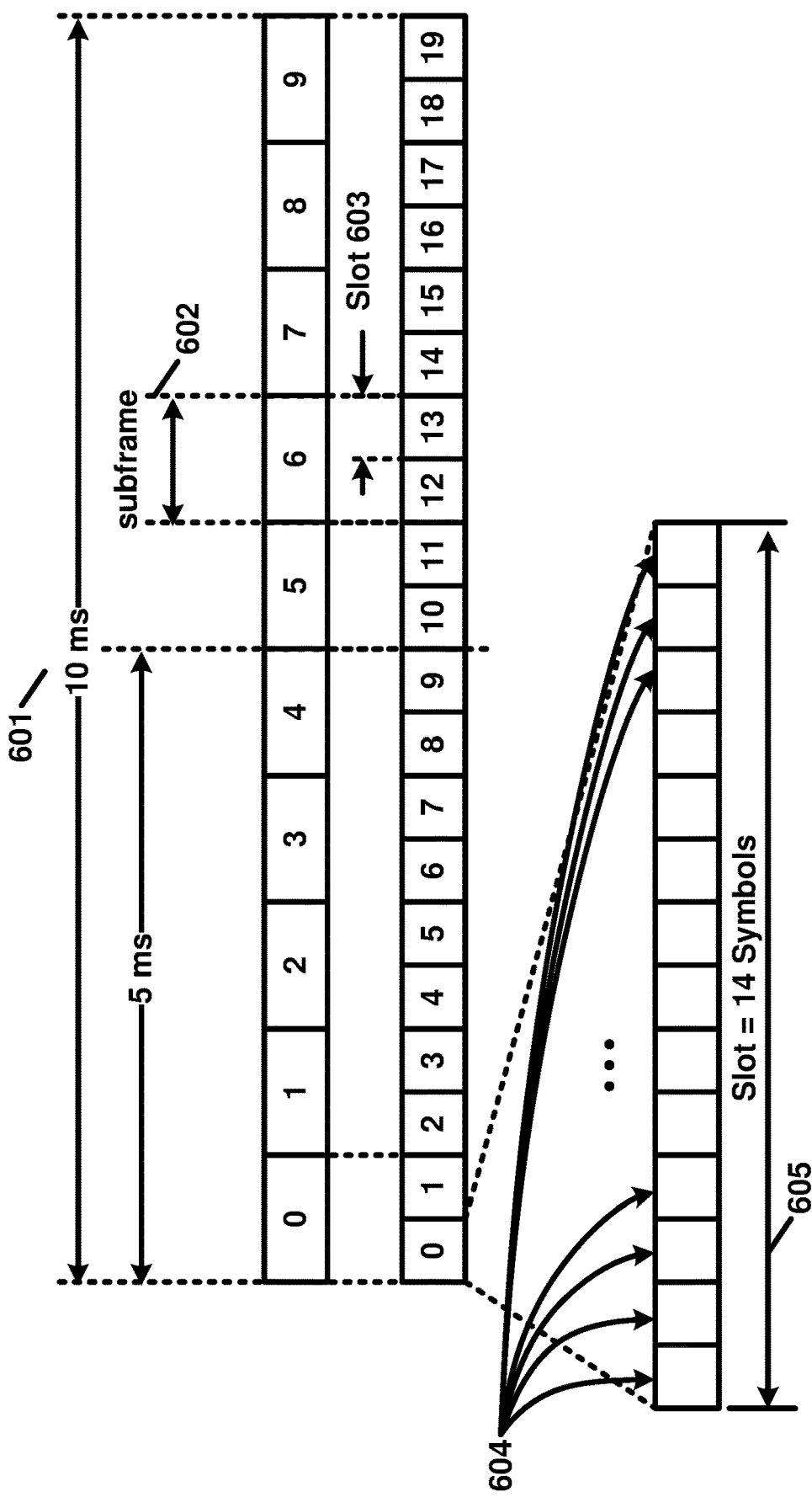
FIG. 6 is a diagram depicting an example frame structure as per an aspect of an embodiment of the present disclosure.

FIG. 6 is a diagram depicting an example frame structure for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame structure. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
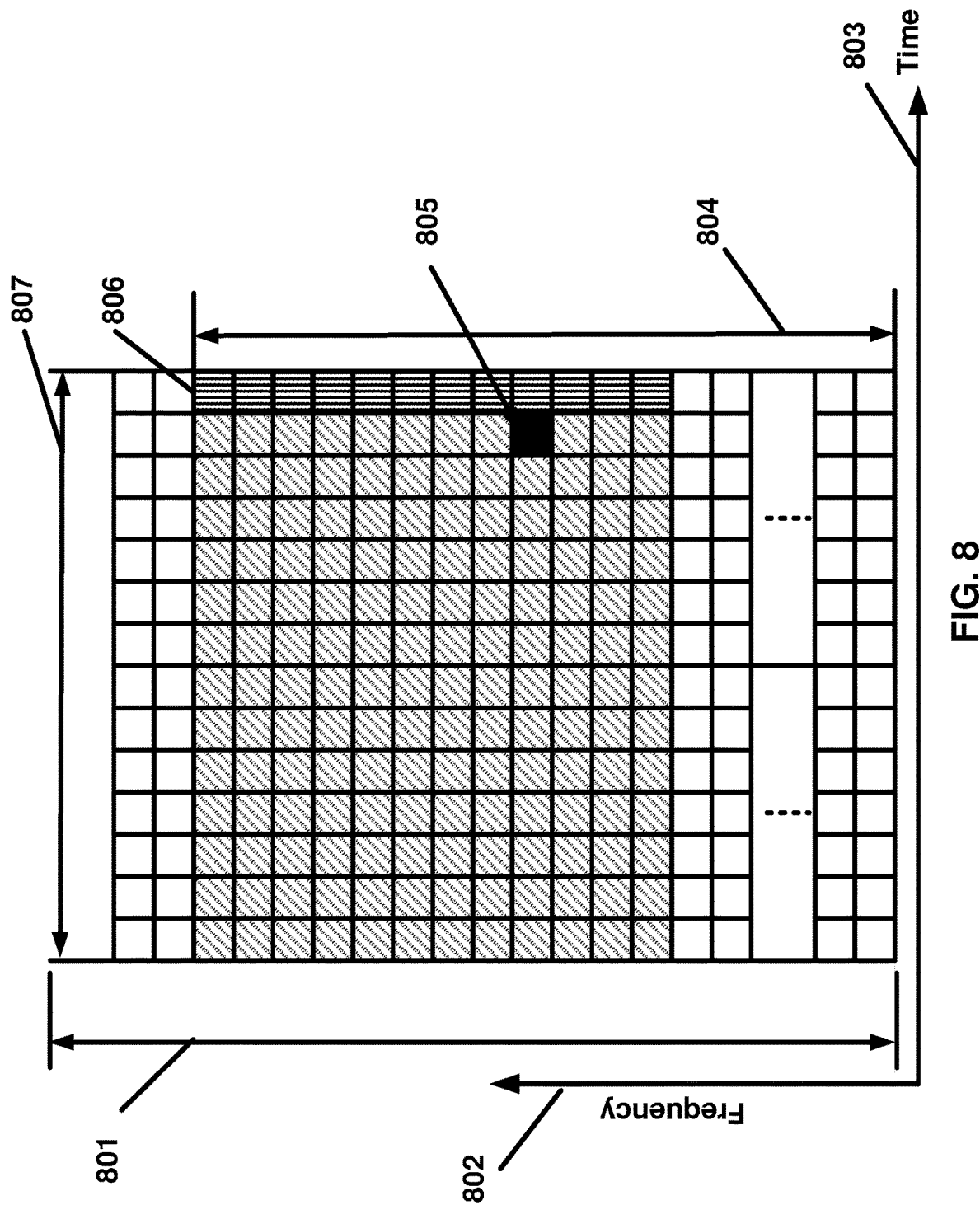
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 9:
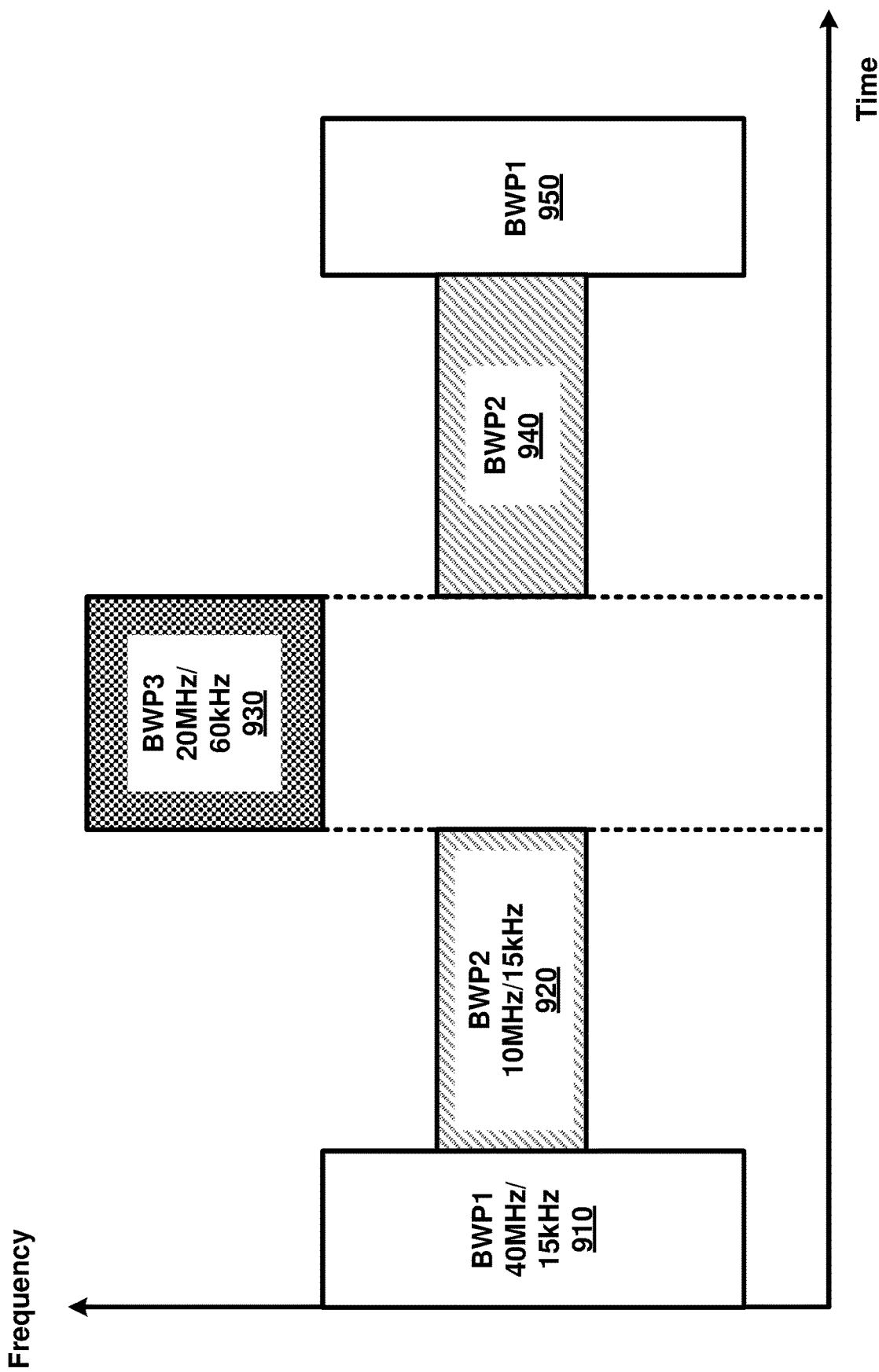
FIG. 9 is an example diagram of configured BWPs as per an aspect of an embodiment of the present disclosure.

FIG. 9 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base statin may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 9 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 10A:
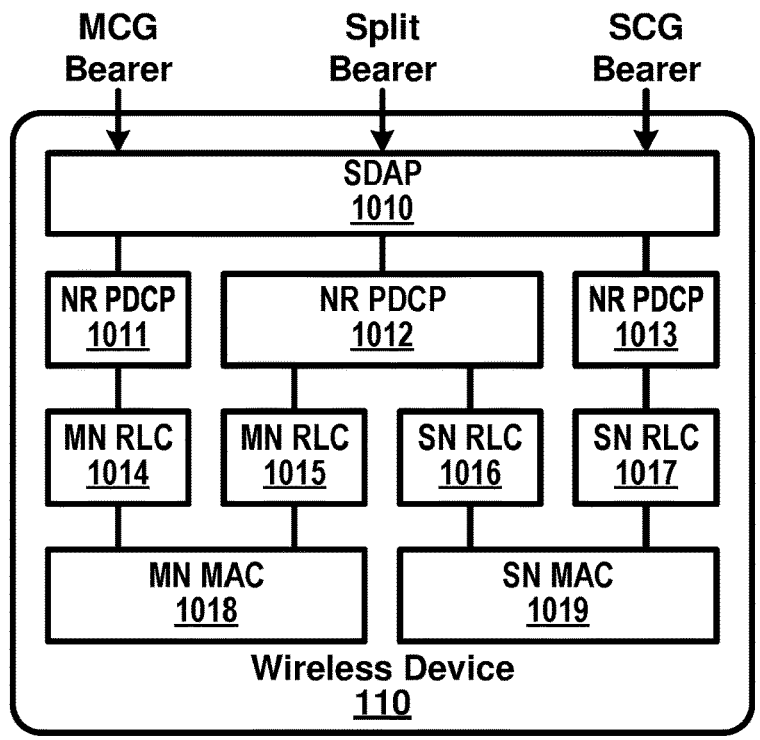
FIG. 10A, and FIG. 10B are diagrams of an example multi connectivity as per an aspect of an embodiment of the present disclosure.
Figure 10B:
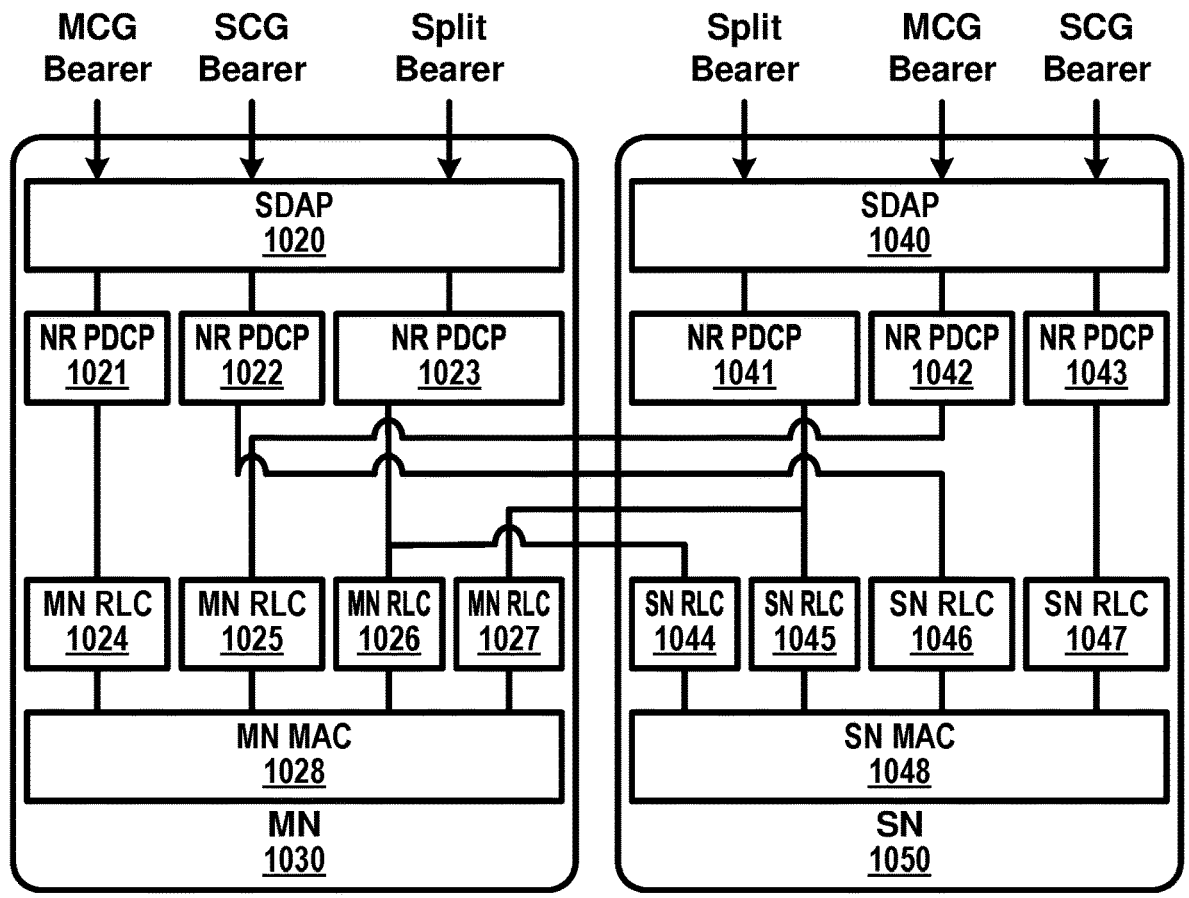

FIG. 10A and FIG. 10B show packet flows employing a multi connectivity (e.g. dual connectivity, multi connectivity, tight interworking, and/or the like). FIG. 10A is an example diagram of a protocol structure of a wireless device 110 (e.g. UE) with CA and/or multi connectivity as per an aspect of an embodiment. FIG. 10B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/ receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer, upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 11:
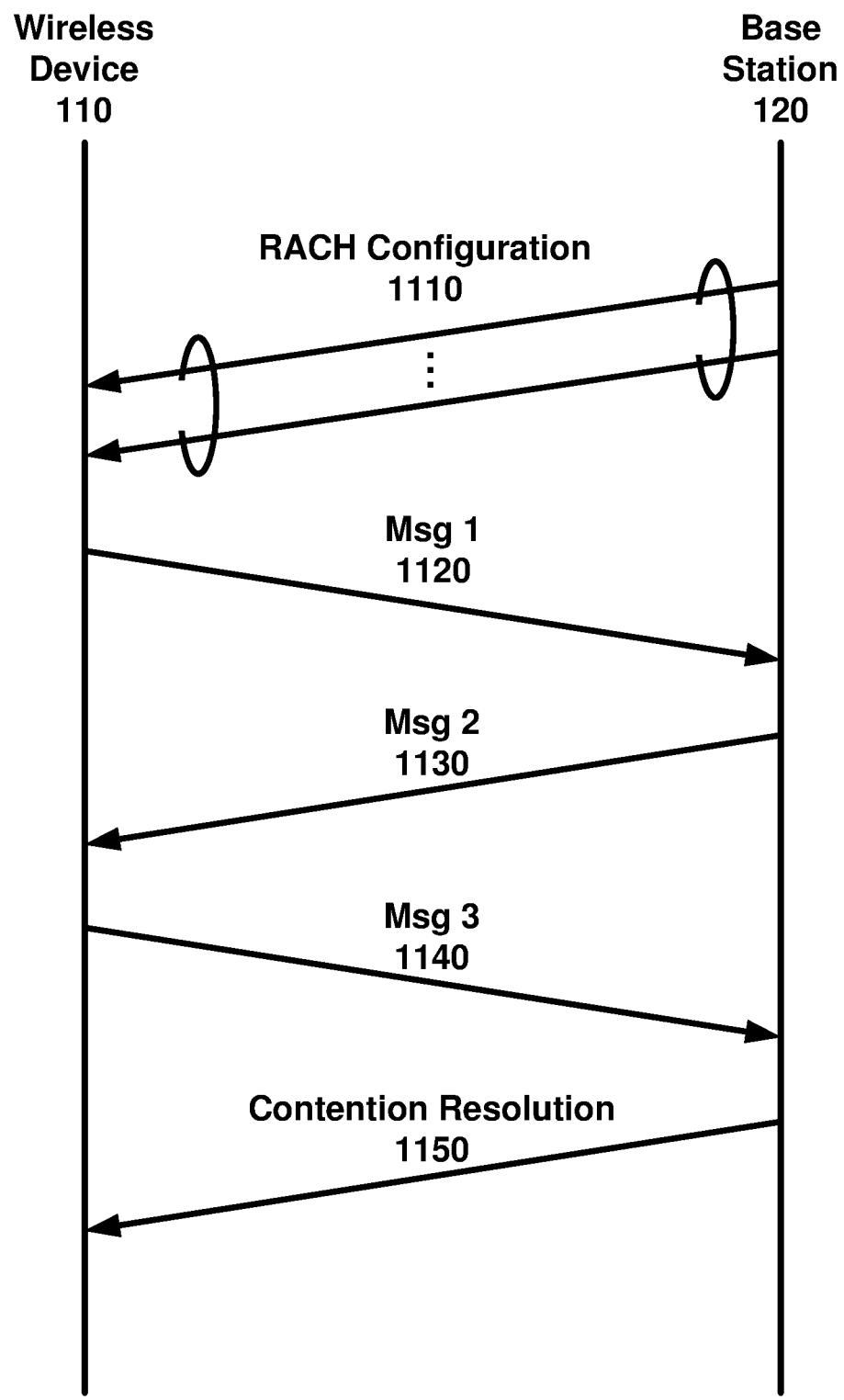
FIG. 11 is a diagram of an example random access procedure as per an aspect of an embodiment of the present disclosure.

FIG. 11 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-ResponseWindow) to monitor a random access response. For beam failure recovery request, a base station may configure a UE with a different time window (e.g., bfr-Response Window) to monitor response on beam failure recovery request. For example, a UE may start a time window (e.g., ra-ResponseWindow or bfr-ResponseWindow) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 12:
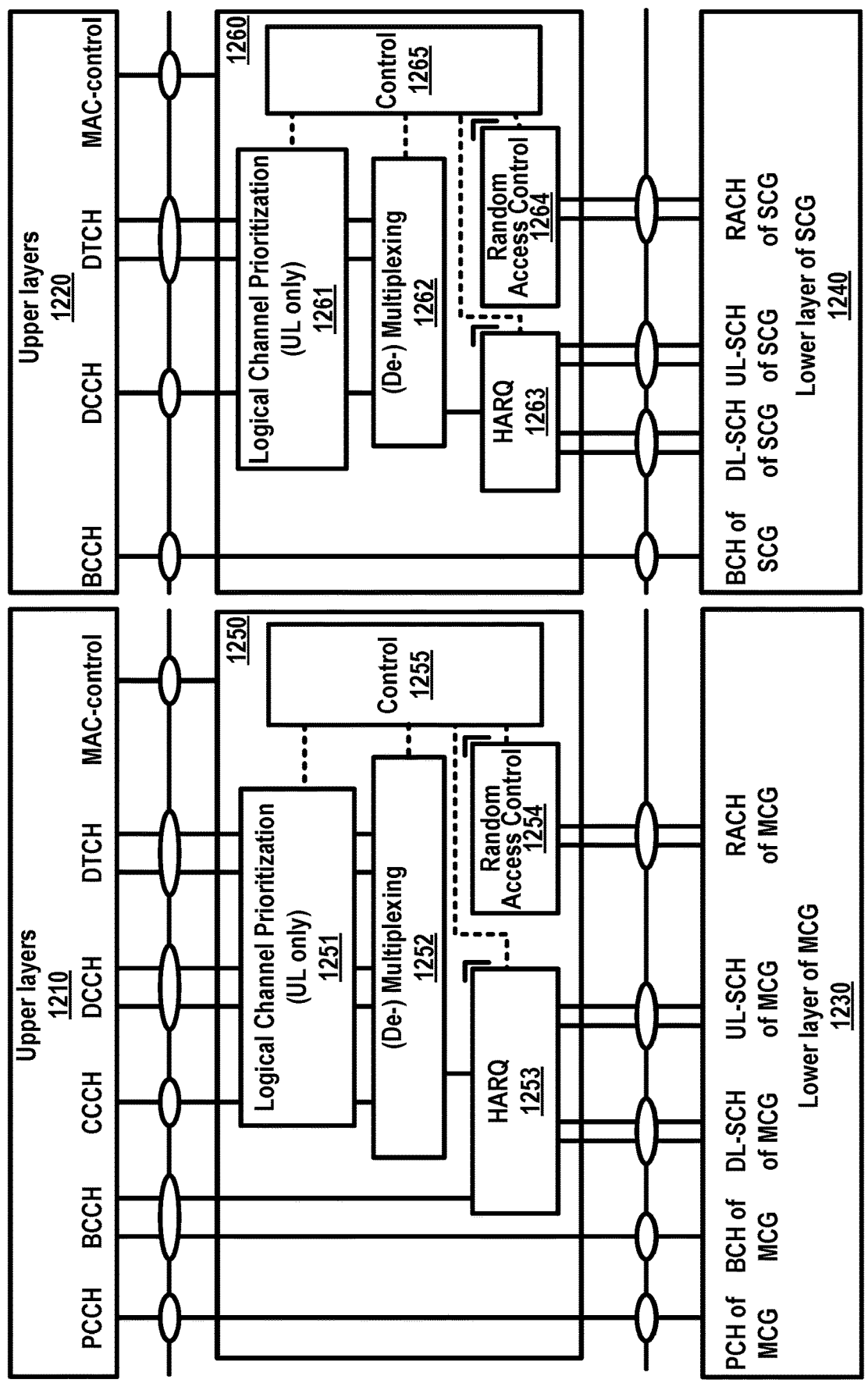
FIG. 12 is a structure of example MAC entities as per an aspect of an embodiment of the present disclosure.
Figure 13:
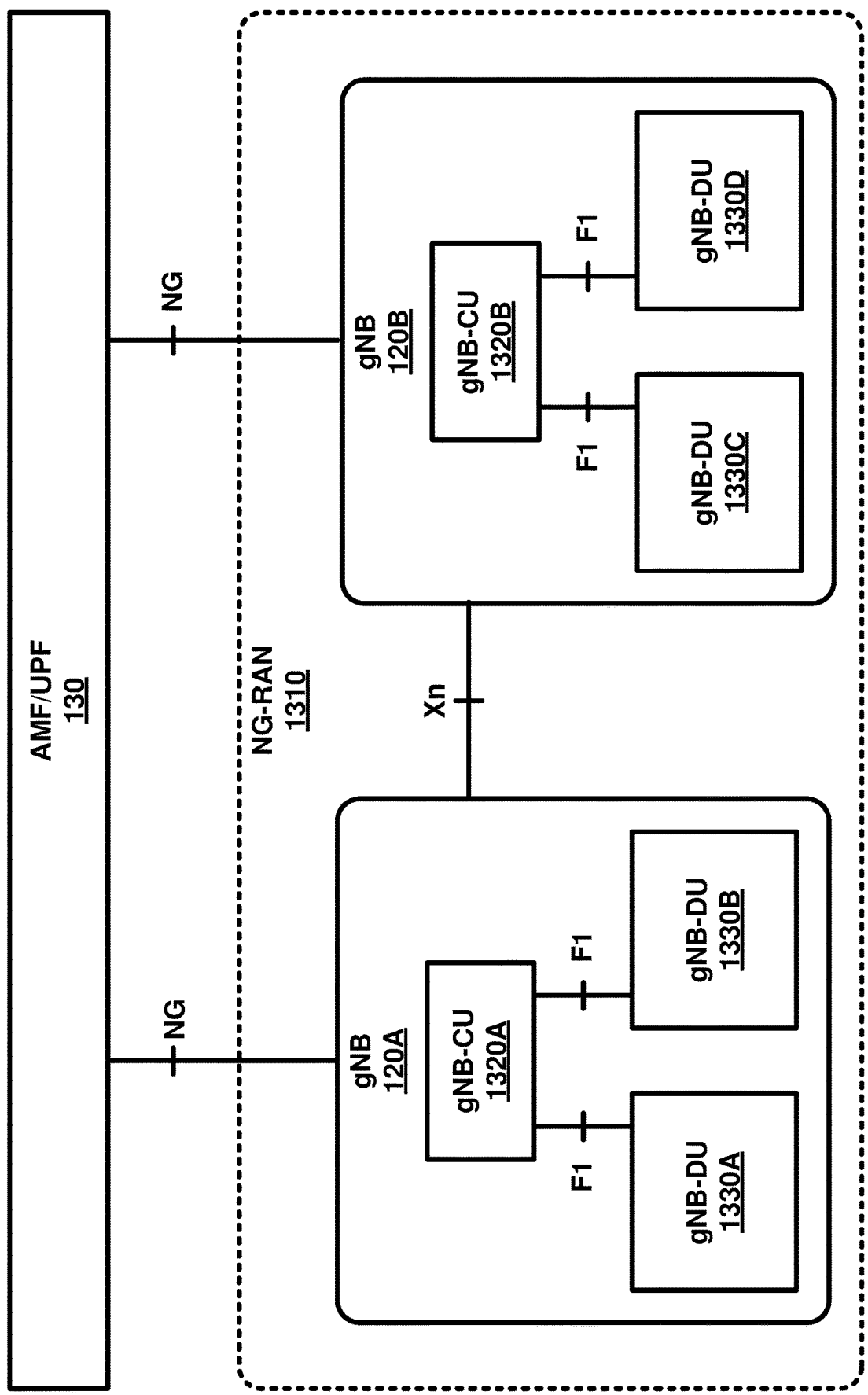
FIG. 13 is a diagram of an example RAN architecture as per an aspect of an embodiment of the present disclosure.

FIG. 12 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

FIG. 13 is an example diagram of a RAN architecture comprising one or more base stations. In an example, a protocol stack (e.g. RRC, SDAP, PDCP, RLC, MAC, and PHY) may be supported at a node. A base station (e.g. 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 14:
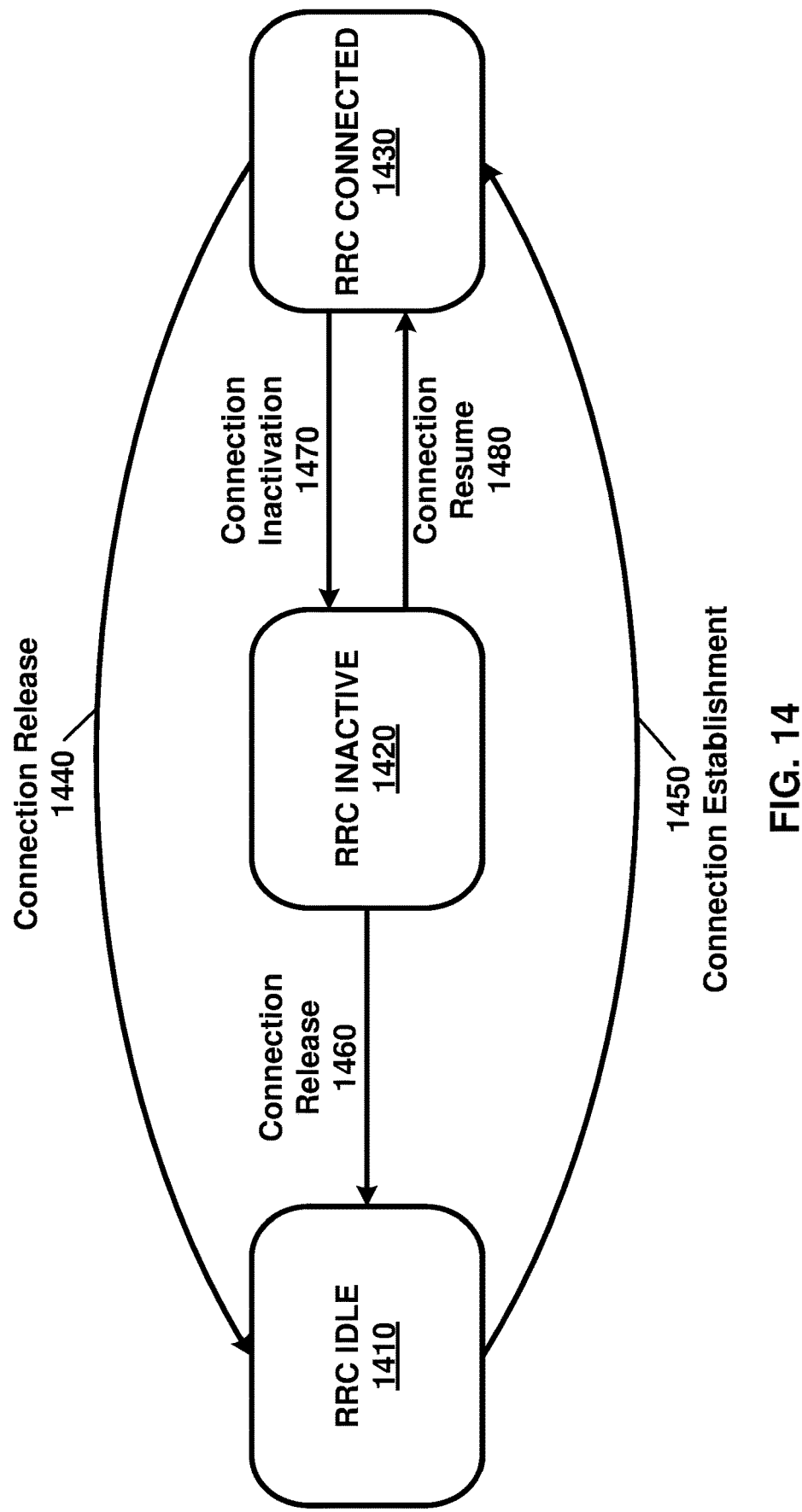
FIG. 14 is a diagram of example RRC states as per an aspect of an embodiment of the present disclosure.

FIG. 14 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example, a base station may control mapping of one or more logical channels (e.g., by the wireless device) to one or more transmission durations and/or numerologies and/or transmission time intervals (TTIs), e.g. TTI durations and/or cells. In an example, base station may configure (e.g., using RRC) a maximum transmission duration for each logical channel in a plurality of logical channels. In an example, the maximum transmission duration may correspond to a maximum PUSCH duration. In an example, the maximum transmission duration may correspond to a maximum duration of a transport block. In an example, a transmission duration may be smaller than or equal to a TTI duration corresponding to the transmission duration. In an example, configuration parameters for a logical channel may comprise an information element indicating the maximum transmission duration and/or maximum PUSCH duration and/or the maximum transport block duration. In an example, the mapping may be semi-static (e.g., with RRC configuration), dynamic (e.g., using physical layer and/or MAC layer signalling), pre-configured at the wireless device, hard split/soft split, etc. In an example, a wireless device may support a plurality of TTIs and/or numerologies from a single cell. In an example, a plurality of TTIs and/or numerologies and/or cells may be handled by a plurality of MAC entities. In an example, the plurality of TTIs and/or numerologies and/or cells may be grouped (e.g., based on band, types of service/QoS, etc.) and a group of TTIs/numerologies/cells may be handled by a MAC entity. In an example, the plurality of TTIs and/or numerologies and/or cells may be handled by a single MAC entity.

In an example, network/gNB may configure a radio bearer to be mapped to one or more numerologies/TTI durations/transmission durations/cells. In an example, a MAC entity may support one or more numerologies/TTI durations/transmission durations/cells. In an example, a logical channel may be mapped to one or more numerologies/TTI durations/transmission durations/cells. In an example, one or more logical channels may be mapped to a numerology/TTI duration/transmission duration/cell. In an example, a HARQ entity may support one or more numerologies/TTI durations/transmission durations/cells.

In an example, a service may be associated with one or more requirements (e.g. power consumption, latency, data rate, coverage, etc.). In an example, the base station may choose or configure a wireless device to choose carrier and/or numerology/TTI duration/transmission duration such that the one or more requirements are fulfilled. For example, massive machine to machine communication (mMTC) based applications may require enhanced network coverage for low mobility UEs and may be deployed in sub-6 GHz band with extended symbol durations. In an example, enhanced mobile broadband (eMBB) based applications may require high data rate and may exploit the benefits of large spectrum available in above-6 GHz band. In an example, a UE may aggregate a plurality of carriers and/or PHY numerologies supporting different service verticals concurrently.

In an example, different services may be considered to support various applications and requirements. In an example, SPS may be supported by a plurality of service verticals. In an example, ultra-reliable low-latency communication (URLLC) based applications may use frequent (e.g., every slot, subframe or a plurality of subframes) SPS resources to reduce the user plane latency. In an example, eMBB may require SPS support for HD video streaming, VoIP, etc. In an example, mMTC may use SPS for periodical reporting of events. In an example, SPS may be supported for service verticals operating on different carriers. In an example, SPS may be supported on one or more carriers. In an example, SPS may be supported on a primary carrier.

In an example, one numerology may correspond to one subcarrier spacing in the frequency domain. In an example, by scaling a basic subcarrier spacing by an integer N, different numerologies may be supported. In an example, one TTI duration/transmission duration may correspond to a number of consecutive symbols in the time domain in one transmission direction. Different TTI durations/transmission durations may be defined when using different number of symbols (e.g. corresponding to a mini-slot, one slot or several slots in one transmission direction). In an example, the combination of one numerology and one TTI duration/transmission duration may determine how transmission is to be made on the physical layer. In an example, which numerologies and/or TTI durations/transmission duration a logical channel of a radio bearer may be mapped to may be configured and reconfigured via RRC signalling. In an example, the mapping may not be visible to RLC, e.g., the RLC configuration may be per logical channel with no dependency on numerologies and/or TTI durations/transmission duration. In an example, ARQ may operate on a numerology and/or TTI duration/transmission duration the logical channel is configured with. In an example, a single MAC entity may support one or multiple numerologies and/or TTI durations. In an example, logical channel prioritization procedure may take into account the mapping of one logical channel (LCH) to one or more numerologies and/or TTI durations/transmission duration. In an example, HARQ may operate with a plurality of numerologies and TTI durations/transmission duration. In an example, characteristics of the numerology beyond the TTI/transmission duration may be visible to MAC.

In an example, MAC in a gNB may include dynamic resource scheduler that allocate physical layer resources for the downlink and the uplink. In an example, taking into account the UE buffer status and the QoS requirements of each UE and associated radio bearers, schedulers may assign resources between UEs. In an example, schedulers may assign resources taking account the radio conditions at the UE identified through measurements made at the gNB and/or reported by the UE. In an example, schedulers may assign radio resources in a unit of TTI (e.g. one mini-slot, one slot, or multiple slots). Resource assignment may consist of radio resources (e.g., resource blocks). In an example, semi-persistent scheduling (SPS) may be supported. In an example, the UE may skip UL grant if there is no data in the buffer rather than sending a padding BSR. In an example, UEs may identify the resources by receiving a scheduling (resource assignment) channel. In an example, measurement reports may be required to enable the scheduler to operate in both uplink and downlink. These may include transport volume and measurements of a UEs radio environment. In an example, uplink buffer status reports may be needed to provide support for QoS-aware packet scheduling. Uplink buffer status reports may refer to the data that is buffered in the logical channel queues in the UE. The uplink packet scheduler in the eNB may be located at MAC level. The buffer reporting scheme used in uplink may be flexible to support different types of data services. Constraints on how often uplink buffer reports are signalled from the UEs can be specified by the network to limit the overhead from sending the reports in the uplink.

In an example, to provide uplink grant for a TTI/transmission duration and/or numerology and/or cell, the UE may provide indication of logical channels for which uplink grant is required and are mapped to the TTI/transmission duration/numerology/cell. In an example, the base station may provide an uplink grant corresponding to default TTI/transmission duration/numerology/cell after receiving a scheduling request from a wireless device. In an example, NR scheduling request mechanism may indicate the logical channels or TTI/transmission duration/numerology for which uplink grant is required. In an example, logical channel ID and/or logical channel group ID and/or TTI/transmission duration/numerology along with scheduling request may be provided by the wireless device. In an example, scheduling request resource may be for a given TTI/transmission duration/numerology or one or more (e.g., group of) logical channels. In an example, the NR scheduling request may indicate the TTI/transmission duration/numerology for which uplink grant is required.

In an example, different TTI/transmission durations may be configured for NR (e.g., one mini-slot, one slot, or a plurality of slots). In an example, eMBB traffic may be pre-empted by URLLC transmissions. In an example, the gNB MAC may dynamically schedule physical layer resources for the downlink and the uplink. In an example, considering the traffic volume and the QoS requirements of a UE and associated radio bearers, gNB scheduler may assign resources.

In an example, gNB scheduler may assign resources considering the radio conditions at the UE identified through measurements made at the gNB and/or reported by the UE.

In an example, radio resource allocations may be valid for (or indicate resources for) one TTI (e.g. one mini-slot, one slot, or a plurality of slots). In an example, radio resource allocation may indicate resources for a plurality of TTIs. The resource assignment may comprise indication of radio resources (e.g., resource blocks). In an example, in the downlink, the gNB may pre-empt existing resource allocations to accommodate latency critical data. In an example, a UE may identify the resources by receiving a scheduling (resource assignment) channel. In an example, measurement reports may enable the scheduler to operate in uplink and downlink. The measurements may include transport volume and measurements of a UEs radio environment.

In an example, uplink buffer status reports may provide support for QoS-aware packet scheduling. In an example, uplink buffer status reports may refer to the data that is buffered in the logical channel queues in the UE. In an example, the uplink packet scheduler in the gNB may be located at MAC level. In an example, the buffer status reporting scheme used in uplink may be flexible to support different types of data services. In an example, constraints on how often uplink buffer reports are signalled from the UEs may be configured at the UE by the network/gNB to limit the overhead.

In LTE, scheduling requests (SRs) may be used for requesting UL-SCH resources for new transmissions when a UE has no valid grant. In an example, if SR resources are not configured for the UE, the UE may initiate a Random Access procedure in order to receive a scheduling grant in uplink. In LTE, SR may consist one bit of information and may indicate that the UE needs an uplink grant. In an example, upon the reception of a one-bit SR, gNB may not know which logical channel (associated with certain QCI) has data available for transmission, or the amount of data available for transmission at the UE. In an example, gNB may indicate the numerology/TTI duration/transmission duration in the grant. In an example, the UE may indicate to the gNB the desired numerology/TTI duration/transmission duration.

In an example, SR and/or BSR may report UE buffer status of one or more logical channels and/or logical channel groups (priority and/or the buffer size) and numerology/TTI duration/transmission duration. In an example, SR may indicate the type of LCG with available data, and/or the amount of available data associated with the LCG. In an example, by indicating the amount of available data associated with the LCG that needs grant at the UE, gNB may provide suitable grant size on the preferred numerology/TTI duration/transmission duration to the UE. In an example, to avoid the delay caused by BSR grant allocation, grant-free transmission of BSR without sending an SR may be supported.

In an example, grant-free transmission mechanisms may be used for delay critical use cases such as URLLC. In an example, UE-specific resource allocation may be used for BSR transmission. In an example, if grant-free transmissions are supported, the wireless device may transmit BSR per logical channel and/or logical channel group and/or short BSR. In an example, the buffer status report for high priority traffic may be transmitted using the grant-free channel. In an example, the grant-free resources assigned per UE may be used for transmission of BSR only. In an example, the grant-free resources assigned per UE may be used for transmission of BSR and data. In an example, the grant-free resources may be utilized for transmission of data, if there is no BSR pending for transmission.

In LTE, the UE may transmit a BSR when there is new data available in the buffer with higher priority than the existing data, while the UE may not be allowed to transmit a BSR if the new data has the same or lower priority than the existing data. This may lead to information mismatch between the UE and gNB, resulting in a long unnecessary scheduling delay until the UE can empty its transmission buffer.

In an example, the UE may transmit BSR when new data becomes regardless of its priority. In an example, the gNB may configure the UE to transmit BSR when new data becomes available regardless of its priority.

Figure 15:
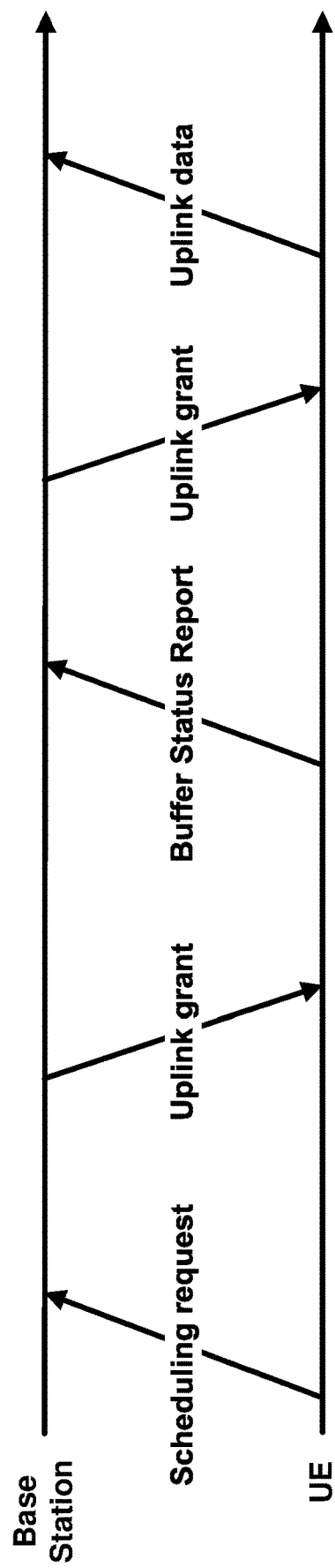
FIG. 15 is a diagram of an example data scheduling as per an aspect of an embodiment of the present disclosure.

Example uplink scheduling procedure (e.g., used in LTE) is shown in FIG. 15. In an example, scheduling request (SR) may be used for requesting UL-SCH resources for new transmission. In an example, SR may be triggered when a regular buffer status report (BSR) is triggered and UE doesn't have resources for transmission for at least the regular BSR. In an example, regular BSR may be triggered when data becomes available for transmission in the uplink.

In an example in LTE, SR may be transmitted on physical uplink control channel (PUCCH) and may be configured with one bit to save control channel overhead. SR may be used to inform the eNB that there is new data in one or more buffers associated with the UE's logical channels. The eNB may schedule some resources and may indicate to UE in the downlink control information (DCI) as uplink grant after the SR is received. The UE may transmit BSR on the uplink grant if logical channel buffers are not empty and the eNB may schedule the UE with new resources.

In an example, NR may support different service requirements, such as eMBB, URLLC, etc. Uplink data may have critical delay requirement (e.g., URLLC). In an example, gNB may need to know such requirement for efficient scheduling, because eMBB and URLLC may have different physical layer scheduling procedure and channel structure. In an example, a logical channel may be mapped to a numerology/TTI duration/transmission duration based on one or more criteria (e.g. UE capability, service requirements, QoS, . . . ).

In an example, grant-free uplink resource may be dedicated for a UE. In an example, if dedicated grant-free resource is allocated to a UE and the grant-free resource is frequent/dense enough for satisfying latency requirements, the UE may not need SR to request resource for data and BSR. In an example, the grant-free resource allocated to a UE may be contention based. In an example, the grant-free resources allocated to a UE may not be dense enough to fulfil ultra-low latency requirements of URLLC. In an example, a UE may need SR procedure for supporting URLLC. In an example, SR may indicate information about data pending in the UE.

In an example in NR, a UE may not multiplex data from all logical channels into one MAC PDU (e.g., for better support of QoS). In an example, one MAC PDU may consist of data from one or more logical channels (e.g., with the same QoS). In an example, gNB may include only one logical channel in a LCG. In an example, only the logical channels with the same QoS may be grouped to one LCG. In an example in NR, BSR may support scheduling with fine granularity, e.g., scheduling per logical channel or per QoS.

In an example, UE may report PDCP data amount and RLC data amount separately when reporting the buffer status. By having PDCP data amount separately, a scheduler, e.g., eNB/gNB, may allocate uplink resource without tight coordination by having a general principle in scheduling PDCP data. In an example, reporting PDCP data amount separately may be beneficial in case of multi-split bearer. For example, for multi-split bearer, some eNB/gNBs may mainly serve the multi-split bearer to avoid resource waste. In this case, reporting PDCP data amount only to some eNB/gNBs, coordination effort may be reduced.

In an example, a logical channel may be mapped to one or more numerology/T duration/transmission duration. In an example, ARQ may be performed on a numerologies/TTI duration/transmission duration that the logical channel (LCH) may be mapped to. In an example, The RLC configuration may be per logical channel without dependency on numerology/TTI length/transmission duration. In an example, Logical channel to numerology/TTI length/transmission duration mapping may be reconfigured via RRC reconfiguration. In an example, HARQ retransmission may be performed across different numerologies and/or TTI durations/transmission durations. In an example, HARQ configuration may be numerology/TTI duration/transmission duration specific.

In an example, a MAC entity may support one or more numerology/TTI duration/transmission duration. In an example, logical channel prioritization (LCP) may consider the mapping of logical channel to one or more numerology/TTI duration/transmission duration. In an example in NR, two BSR formats may be used: one associated with URLLC service and the other associated with eMBB or mMTC services. In an example, the two SR formats may also be associated with larger or smaller grant sizes. In an example in NR, BSR may support reporting a selective number of LCGs and/or LCs to a gNB. In an example, NR may support dynamic scheduling, semi-persistent scheduling and grant-less uplink transmissions. In an example, scheduling function may support dynamic and semi-static switching between resources corresponding to different numerologies for a UE.

In an example, a wireless device may receive one or more messages comprising one or more radio resource configuration (RRC) messages from one or more base stations (e.g., one or more NR gNBs and/or one or more LTE eNBs and/or one or more eLTE eNBs, etc.). In an example, the one or more messages may comprise configuration parameters for a plurality of logical channels. In an example, the one or more messages may comprise a logical channel identifier for each of the plurality of logical channels. In an example, the logical channel identifier may be one of a plurality of logical channel identifiers. In an example, the plurality of logical channel identifiers may be pre-configured. In an example, the logical channel identifier may be one of a plurality of consecutive integers.

In an example, the plurality of logical channels configured for a wireless device may correspond to one or more bearers. In an example, there may be one-to-one mapping/correspondence between a bearer and a logical channel. In an example, there may be one-to-many mapping/correspondence between one or more bearers and one or more logical channels. In an example, a bearer may be mapped to a plurality of logical channels. In an example, data from a packet data convergence protocol (PDCP) entity corresponding to a bearer may be duplicated and mapped to a plurality of radio link control (RLC) entities and/or logical channels. In an example, scheduling of the plurality of logical channels may be performed by a single medium access control (MAC) entity. In an example, scheduling of the plurality of logical channels may be performed by a two or more MAC entities. In an example, a logical channel may be scheduled by one of a plurality of MAC entities. In an example, the one or more bearers may comprise one or more data radio bearers. In an example, the one or more bearers may comprise one or more signaling radio bearers. In an example, the one or more bearers may correspond to one or more application and/or quality of service (QoS) requirements. In an example, one or more bearers may correspond to ultra reliable low latency communications (URLLC) applications and/or enhanced mobile broadband (eMBB) applications and/or massive machine to machine communications (mMTC) applications.

In an example, a first logical channel of the plurality of logical channels may be mapped to one or more of a plurality of transmission time intervals (TTIs)/transmission durations/numerologies. In an example, a logical channel may not be mapped to one or more of the plurality of TTIs/transmission durations/numerologies. In an example, a logical channel corresponding to a URLLC bearer may be mapped to one or more first TTIs/transmission durations and a logical corresponding to an eMBB application may be mapped to one or more second TTIs/transmission durations, wherein the one or more first TTIs/transmission durations may have shorter duration than the one or more second TTIs/transmission durations. In an example, the plurality of TTIs/transmission durations/numerologies may be pre-configured at the wireless device. In an example, the one or more messages may comprise the configuration parameters of the plurality of TTIs/transmission durations/numerologies. In an example, a base station may transmit a grant to a wireless device, wherein the grant comprises indication of a cell and/or a TTI/transmission duration/numerology that the wireless device may transmit data. In an example, a first field in the grant may indicate the cell and a second field in the grant may indicate the TTI/transmission duration/numerology. In an example, a field in the grant may indicate both the cell and the TTI/transmission duration/numerology.

In an example, the one or more messages may comprise a logical channel group identifier for one or more of the plurality of the logical channels. In an example, one or more of the plurality of logical channels may be assigned a logical channel group identifier n, $0 \leq n \leq N$ (e.g., N=3, or 5, or 7, or 11 or 15, etc.). In an example, the one or more of the plurality of logical channels with the logical channel group identifier may be mapped to a same one or more TTIs/transmission durations/numerologies. In an example, the one or more of the plurality of logical channels with the logical channel group identifier may only be mapped to a same one or more TTIs/transmission durations/numerologies. In an example, the one more of the plurality of logical channels may correspond to a same application and/or QoS requirements. In an example, one or more first logical channels may be assigned logical channel identifier(s) and logical channel group identifier(s) and one or more second logical channels may be assigned logical channel identifier(s). In an example, a logical channel group may comprise of one logical channel.

In an example, the one or more messages may comprise one or more first fields indicating mapping between the plurality of logical channels and the plurality of TTIs/transmission durations/numerologies and/or cells. In an example, the one or more first fields may comprise a first value indicating a logical channel is mapped to one or more first TTI duration/transmission duration shorter than or equal to the first value. In an example, the one or more first fields may comprise a second value indicating a logical channel is mapped to one or more second TTI durations/transmission durations longer than or equal to the second value. In an example, the one or more first fields may comprise and/or indicate one or more TTIs/transmission durations/numerologies and/or cells that a logical channel is mapped to. In an example, the mapping may be indicated using one or more bitmaps. In an example, if a value of 1 in a bitmap associated with a logical channel may indicate that the logical channel is mapped to a corresponding TTI/transmission duration/numerology and/or cell. In an example, if a value of 0 in the bitmap associated with a logical channel may indicate that the logical channel is not mapped to a corresponding TTI/transmission duration/numerology and/or cell. In an example, the one or more messages may comprise configuration parameters for the plurality of the logical channels. In an example, the configuration parameters for a logical channel may comprise an associated bitmap for the logical channel wherein the bitmap indicates the mapping between the logical channel and the plurality of TTIs/transmission durations/numerologies and/or cells.

In an example, a first logical channel may be assigned at least a first logical channel priority. In an example, the first logical channel may be assigned one or more logical channel priorities for one or more TTIs/transmission duration/numerologies. In an example, the first logical channel may be assigned a logical channel priority for each of the plurality of TTIs/transmission durations/numerologies. In an example, a logical channel may be assigned a logical channel priority for each of one or more of the plurality of TTIs/transmission durations/numerologies. In an example, a logical channel may be assigned a logical channel priority for each of one or more TTIs/transmission durations/numerologies wherein the logical channel is mapped to the each of the one or more TTIs/transmission durations/numerologies. In an example, the one or more messages may comprise one or more second fields indicating priorities of a logical channel on one or more TTIs/transmission durations/numerologies. In an example, the one or more second fields may comprise one or more sequences indicating priorities of a logical channel on one or more TTIs/transmission durations/numerologies. In an example, the one or more second fields may comprise a plurality of sequences for the plurality of logical channels. A sequence corresponding to a logical channel may indicate the priorities of the logical channel on the plurality of TTIs/transmission durations/numerologies/cells or one or more of the plurality of TTIs/transmission durations/numerologies/cells. In an example, the priorities may indicate mapping between a logical channel and one or more TTIs/transmission durations/numerologies. In an example, a priority of a logical channel with a given value (e.g., zero or minus infinity or a negative value) for a TTI/transmission durations/numerology may indicate that the logical channel is not mapped to the TTI/transmission duration/numerology. In an example, sizes of the sequence may be variable. In an example, a size of a sequence associated with a logical channel may be a number of TTIs/transmission durations/numerologies to which the logical channel is mapped. In an example, the sizes of the sequence may be fixed, e.g., the number of TTIs/transmission durations/numerologies/cells.

In an example, network/gNB may indicate/signal to a wireless device mapping between a logical channel and one or more numerologies/TTI durations/transmission durations. A UE may support a plurality of TTIs/transmission durations/numerologies from a cell. In an example, mapping may be semi-static (e.g., using radio resource configuration (RRC)) and/or dynamic (e.g., using MAC layer or physical layer signaling) and/or hard split/soft split, etc. In an example, a plurality of TTIs/transmission durations/numerologies may be handled by a single MAC entity. In an example, the plurality of TTIs/transmission durations/numerologies may be handled by two or more MAC entities.

In an example, a radio bearer (RB) and/or logical channel (LC) may be configured by network/gNB to be mapped to one or more numerologies/TTI durations. In an example, a MAC entity may support one or more numerologies/TTI durations/transmission durations. In an example, a logical channel may be mapped to one or more numerologies/TTI durations/transmission durations. In an example, a HARQ entity may support one or more numerologies/TTI durations/transmission durations.

In an example, one or more numerologies/TTI durations/transmission durations may be supported by a plurality of serving cells and/or from one serving cell. The radio bearer/logical channel to numerology/TTI duration/transmission duration mapping may be configured when the radio bearer/logical channel is configured/added/established. In an example, the mapping configuration may not be changed until release of the radio bearer. In an example, the mapping configuration may be reconfigured via RRC reconfiguration. In an example, gNB may provide high priority for URLLC traffic to meet the QoS (e.g., delay) requirements of URLLC.

In an example, one or more logical channels with similar QoS requirements (e.g., throughput, latency, etc.) may be mapped to a same MAC entity. In an example, the one or more logical channels mapped to the same MAC entity may be scheduled on a same numerology/TTI duration/transmission duration. In an example, physical layer resources may be shared among one or more MAC entities. In an example, there may be one or more interfaces among the one or more MAC entities. In an example, there may be a centralized control layer above the MAC layer. In an example, physical layer resources may be semi-statically configured (e.g., using RRC) among the one or more MAC entities. In an example, RRC signaling and/or centralized control layer above the MAC layer may indicate the configuration/reconfiguration. In an example, one or more logical channels with similar QoS requirements may be mapped to a same HARQ entity. In an example, the one or more logical channels may be scheduled with a same numerology/TTI length/transmission duration.

In an example in NR, a plurality of numerologies/TTIs/transmission durations may be supported on one carrier and/or on a plurality of carriers. In an example, the services may require a plurality of QoS levels. For example, the URLLC may require ultra-low latency while eMBB may require high throughput. In an example, a UE may support a plurality of services simultaneously.

In an example, mapping between a logical channel to one or more numerologies may be fixed. In an example, mapping between a logical channel to one or more numerologies may be dynamic (e.g., using physical layer or MAC layer signaling). In an example, mapping between a logical channel to one or more numerologies may be semi-static (e.g., using RRC).

In an example in NR, a logical channel may have one or more associated TTIs/numerologies/transmission durations. In an example, a logical channel may be associated with a maximum and/or a minimum TTI duration/transmission duration. For example, a logical channel with URLLC packets may be mapped to numerologies with small TTI durations/transmission durations (e.g., smaller than a threshold) to guarantee the maximum delay requirements. In an example, a logical channel with eMBB packets may be mapped to one or more numerologies with large TTI duration/transmission duration (e.g., larger than a threshold) to improve the throughput. In an example, mapping between a logical channel and one or more TTIs/transmission durations/numerologies may be configured by the high layer signaling, e.g., RRC signaling. In an example, the mapping between a logical channel and one or more TTIs/numerologies may be signaled with DCI and/or MAC control element.

In an example, a TTI/transmission duration/numerology may be indicated in a grant for a UE. A DCI format may comprise one or more fields to indicate to a UE a TTI/transmission duration/numerology for the grant. In an example, a maximum and/or minimum TTI duration/transmission duration the numerology may support may be included in a grant. In an example, at least the TTI/transmission duration for a numerology may be visible to the MAC layer. In an example, the TTI/transmission duration for a numerology may be visible to the MAC layer to perform logical channel and numerology mapping. In an example, one or more TTI/transmission durations may be included in one or more of the DCI formats.

In an example, for one or more numerologies, at least the TTI/transmission duration of the one or more numerologies may be visible to MAC. In an example, URLLC services may require a short TTI/transmission duration to achieve low latency. In an example, eMBB services may use a large TTI/transmission duration and/or slot aggregation to achieve high throughput. In an example, mMTC services may require narrow bandwidth capacity for intermittent small data.

In an example, NR may provide support for carrier aggregation. In an example, carriers with the same or different numerologies may be supported. In an example, a plurality of TTIs/numerologies may be time domain multiplexed (e.g., TDM) and/or frequency domain multiplexed (e.g., FDM) in a carrier. In an example, slot aggregation may be supported. Data transmission may be scheduled to span one or more slots. In an example, slot aggregation may be used for eMBB services with large volume of data. In an example, min-slots may be used for delay-critical URLLC services by occupying small number of symbols.

In an example, a radio bearer may be configured by network to be mapped to one or more numerologies/TTI durations/transmission durations. In an example, a logical channel may be mapped to one or more numerologies/TTI durations/transmission durations. In an example, ARQ transmission/retransmission may occur across different numerologies/TTI durations/transmission durations. In an example, a MAC scheduler may determine that ARQ transmission/retransmission may be transmitted over which numerology/TTI duration/transmission duration. In an example, the RLC layer may be transparent to the PHY numerologies/TTI durations/transmission durations. In an example, the RLC configuration may be per logical channel. There may be one RLC configuration for a logical channel. In an example, RRC may reconfigure mapping between a radio bearer/logical channel and one or more numerologies/TTI durations/transmission durations.

In an example, NR may support ARQ transmissions/retransmissions across a plurality of numerologies/TTI durations/transmission durations if a corresponding radio bearer is configured to a plurality of numerologies/TTI durations/transmission durations. In an example, RRC may reconfigure mapping between a radio bearer/logical channel and one or more numerologies/TTI durations/transmission duration.

In an example, eMBB and URLLC may dynamically share a same TTI/transmission duration/numerology or use different TTIs/transmission durations/numerologies. In an example, URLLC transmission may occur in resources scheduled for ongoing eMBB traffic in some scenarios. In an example, mapping between a logical channel and one or more TTIs/transmission durations/numerologies may be semi-static. In an example, the semi-static mapping may be achieved by higher-layer signaling. In an example, mapping between a logical channel and one or more TTIs/transmission durations/numerologies may be dynamic. In an example, the mapping may be dynamically indicated in DCI in (e)PDCCH. For example, a gNB may explicitly command which one or more logical channels may be transmitted over which numerology/TTI/transmission duration dynamically. In an example, fine granularity BSR (e.g., for many logical channel groups and/or per logical channel) may be supported. In an example, mapping between logical channel and one or more TTIs/transmission durations/numerologies may be fixed/hard mapping.

In an example, a single HARQ entity may support one or more numerologies/TTIs/transmission durations. In an example, HARQ transmissions transmitted over one TTI/transmission duration/numerology may be switched to a different TTI/transmission duration/numerology in some scenarios. For example, when the UE undergoes sudden channel variations due to high speed, the gNB may use another TTI/transmission duration/numerology which may counteract the frequency offset. The HARQ entity may maintain one or more process IDs towards one or more numerologies/TTIs/transmission durations. In an example, HARQ configuration may not be numerology/TTI duration/transmission duration specific. In an example, within a single carrier, a single HARQ entity may support one or more numerologies/TTI durations/transmission durations. HARQ transmission and retransmissions may occur on different numerologies/TTIs/transmission durations.

In an example for carrier aggregation, a HARQ entity may support one or more numerologies across the carriers. In an example, cell index and/or process ID where transmission/retransmissions occur may be indicated. In an example, a T/transmission duration/numerology may be used by one or more logical channels corresponding to a service. In an example, a TTI/transmission duration/numerology may be used by a plurality logical channels corresponding to a plurality of services. In an example, a TTI/transmission duration/numerology may be shared by one or more logical channels corresponding to one or more services. In an example, TTI/transmission duration/numerology sharing may be allowed while meeting requirements for different services. For example, one or more logical channels corresponding to an eMBB service with delay tolerability may use a TTI/transmission duration/numerology for URLLC if performance of URLLC service is not harmed.

In an example, a sub-band within a carrier may be configured with a numerology. In an example, a transport block (TB) may be allocated within a sub-band. In an example, a TB may be transmitted on a (e.g., only one) numerology/TTI/transmission duration. In an example in NR, for delay sensitive services, like URLLC, numerology with reduced TTI/transmission duration may be adopted to transmit and retransmit the URLLC data. In an example, more control signaling may be needed for numerologies with shorter TTIs/transmission durations than numerologies with longer TTIs/transmission durations. In an example for the delay tolerable service, like eMBB, a numerology with long TTI/transmission duration may be adopted. In an example, the network or the gNB may provide differentiated QoS to different logical channels via mapping between the logical channels and the numerologies/TTIs/transmission durations and/or assigning priorities to the logical channels.

In an example, a first priority may be configured for a logical and the first priority may be independent of the one or more numerologies/TTIs/transmission durations. In an example, one or more priorities may be configured for a logical channel. In an example, a priority may be configured for each of a plurality of numerologies/TTIs/transmission durations that the logical channel may be mapped to. In an example, a priority may be configured for each of a plurality of numerologies/TTIs/transmission duration that are configured for a wireless device.

In an example, a plurality of carriers with one or more numerologies may be aggregated in NR. In an example, at least TI length/transmission duration of one or more numerologies may be visible to MAC layer. In an example, a numerology may be characterized by at least by subcarrier spacing (SCS), CP length and TTI length/transmission duration. In an example, TTI length/transmission duration may be defined by a length of subframe, slot and/or mini-slot. In an example, one or more numerologies may have a same TTI length/transmission duration. In an example, one or more numerologies may not have a same TTI length/transmission duration. In an example, TTI length/transmission duration may not differentiate different numerologies. In an example, one or more numerology characteristics such as SCS and CP length may not be visible to MAC layer.

In an example, gNB may configure an index for a TTI/transmission duration/numerology. In an example, an index may be pre-configured for a TTI/transmission duration/numerology. In an example, the numerology/TTI/transmission duration index may be indicated by PHY layer to MAC when a UL grant is received. In an example, a service may only utilize one or more numerologies/TTIs/transmission durations. For example, a LC/DRB for URLLC may be only associated to a numerology/TTI/transmission duration to satisfy QoS with high latency and reliability requirements. In an example, a service (e.g., eMBB) may be transmitted with a plurality of numerologies/TTIs/transmission durations. In an example, an LC/DRB for eMBB may be associated to a plurality of numerologies/TTIs/transmission durations. In an example, a numerology/TTI/transmission duration may only be used for a service (e.g., URLLC). In an example, a numerology/TTI/transmission duration may be used for a plurality of services. A plurality of LCs/DRBs may be associated to a same numerology. In an example, when one or more numerologies/TTIs/transmission durations are configured for a DRB/LC, the PDUs of the LC may only be transmitted on the one or more associated numerologies/TTIs/transmission durations.

In an example, number of MAC entities may be equal to number of schedulers. In an example in NR with a plurality of numerologies/TTIs/transmission durations, a UE may support a plurality of numerologies/TTIs/transmission durations from a cell. In an example, resource allocation on the different numerologies/TTIs/transmission duration from a cell may be scheduled by a same scheduler. In an example, a plurality of MAC entities may handle a plurality of numerologies/TTIs/transmission duration. In an example, the plurality of MAC entities may coordinate for the MAC functions, e.g. DRX, TAT, etc.

In an example, a HARQ entity may be associated to a carrier/cell. In an example, the carrier/cell may support one or more numerologies/TTIs/transmission durations. A HARQ entity may support one or more HARQ processes. In an example HARQ retransmissions may be performed across different numerologies/TTIs/transmission durations. In an example, a HARQ entity may be associated to a numerology/TTI/transmission duration per carrier/cell. A HARQ entity may control one or more HARQ processes. In an example, HARQ retransmission for a HARQ process may be performed on its own numerology/TTI/transmission duration.

In an example, with retransmission cross different numerologies/TTIs/transmission durations, a UE may perform blind detection on different numerologies/TTIs for the PDCCH scheduling retransmission. In an example, the length of HARQ_RTT timer and/or retransmission timer and/or feedback time and/or assignment to actual transmission time to support each asynchronous HARQ process may be fixed or variable according to different numerologies/TTIs/transmission durations for each retransmission. In an example, a HARQ entity may correspond to one numerology per cell. In an example, HARQ retransmission may not occur across different numerologies.

In an example, a logical channel may map to one or more numerologies/TTI durations/transmission durations. In an example, mapping between logical channels and numerologies/TTI durations/transmission durations may be configured by RRC signalling. In an example, a MAC entity may support a plurality of numerologies/TTI durations/transmission durations concurrently. A logical channel may map to one or more numerologies/TTIs/transmission durations. In an example, the one or more numerologies/TTIs/transmission durations may be handled within a single MAC entity. In an example, a MAC PDU may be generated for a numerology/TTI duration/transmission duration. In an example, the MAC may multiplex service data units (SDUs) from one or more LCHs supporting the same numerology/TTI duration/transmission duration using the LCP procedure. When creating a MAC PDU, LCP may consider configured priorities and/or PBRs of a LCH mapped to the corresponding numerology/TTI duration/transmission duration. In an example, LCH priorities and/or PBRs may be configured per numerology/TTI duration/transmission duration e.g. by RRC. In an example, a buffer status report (BSR) may comprise buffer status for LCHs supported by a MAC entity, regardless of numerology/l duration/transmission duration. In an example, a scheduling request (SR) may indicate whether the requested resource is for a low latency TTI duration/transmission duration/numerology or not. In an example, SRs (e.g., SR resources) may be numerology/TTI/transmission duration specific. In an example, SR such may carry additional information bits (e.g. a LCG ID or a bit indicating URLLC or not). In an example, SR may consider the numerologies/TTI lengths/transmission durations supported by a UE.

In an example, gNB may indicate the UE to transmit data from a QoS. In an example, the gNB may provide QoS indication in an UL grant for the UE to use the UL grant only for data from the indicated QoS. In an example, for the gNB to know the UE's buffer status of each QoS, the BSR may indicate buffer status per QoS. In an example, QoS specific UL grant and QoS specific BSR may be used.

In an example, logical channel prioritization and multiplexing may determine which logical channel(s) may be served in a MAC PDU. In an example one or more logical channels may be better served on one or more numerologies/TTI durations/transmission durations than others. In an example, to meet tight latency requirements of URLLC, the corresponding logical channels may be served on a short numerology/TTI duration/transmission duration. In an example, LCP may take the numerology/TTI duration/transmission duration of a MAC PDU into account. In an example, a maximum TTI duration/transmission duration parameter may be configured for a logical channel. In an example, the maximum TTI duration/transmission duration parameter may be used to select which channels to serve. In an example, LCP may be applied to the selected logical channels. In an example, for selection of logical channels to serve for a UL transmission with a TTI duration/transmission duration t, a MAC entity may select one or more logical channels with a maximum TTI duration/transmission duration greater than, or equal to, t. The MAC entity may apply LCP on the one or more logical channels selected.

In an example, the TTI/transmission duration/numerology information may be carried in an uplink grant. In an example, the indication may be explicit (e.g., using a field in the scheduling DCI and/or other DCI). In an example, the indication may be implicit (e.g. the TTI duration/transmission duration of the UL transmission may be same as the DL transmission of the UL grant). In an example, the UL grant may carry the TB size. In an example, a logical channel may be configured by RRC with a maximum TTI duration/transmission duration. In an example, for LCP, UL grant may carry (explicitly and/or implicitly) information on the TTI duration/transmission duration of the UL transmission. In an example, for LCP, UL grant may carry information on the size of the MAC PDU.

In an example, a numerology/TTI duration/transmission duration may be used on a carrier (e.g., one numerology per carrier). In an example, a plurality of numerologies/TTI durations/transmission durations may be used on a carrier. In an example, a MAC entity may serve one or more carriers. In an example, carrier aggregation may support one HARQ entity per carrier. In an example, one HARQ entity may span a plurality of carriers. In an example, HARQ entity may not be restricted to a single numerology/TTI duration/transmission duration. In an example, HARQ retransmissions may be moved from one numerology/TTI duration/transmission duration to another one. In an example, a MAC entity may have one HARQ Entity per carrier. In an example, HARQ entity may not be restricted to a single numerology/TTI duration/transmission duration. In an example, discontinuous reception (DRX) function of MAC may not be restricted to a single numerology/TTI duration/transmission duration. In an example, a UE may have one MAC entity per cell group. In an example, a MAC entity may not be restricted to a single numerology/TTI duration/transmission duration.

In an example, logical channel to numerology/TTI length/transmission duration mapping may be configured/reconfigured via RRC. In an example, numerology/TTI/transmission duration may be related to the requirement/characteristics of data transmission, e.g., latency. In an example, a numerology/TTI/transmission duration may be configured when an RB is configured/established. In an example, a single logical channel may be mapped to one or more numerologies/ATI durations/transmission durations.

In an example, a range of numerologies/TTI durations/transmission durations may be configured for a RB's logical channel. For example, minimum numerology/TTI duration/transmission duration and/or maximum numerology/TTI duration/transmission duration may be signalled for the RB/logical channel. In an example, to configure a plurality of numerologies/TTI durations for the RB, a range of associated numerology/TTI duration/transmission duration may be signaled for the RB.

In an example, HARQ retransmission may be performed across one or more numerologies and/or TTI durations/transmission durations. In a synchronous HARQ procedure example, a maxHARQ-Tx and/or maxHARQ-Msg3Tx may be configured. In an example, an asynchronous HARQ procedure may be used in NR. In an example, LCP may take into account restriction of logical channel to numerology/TTI length/transmission duration mapping.

In an example, URLLC traffic may not be sent using eMBB numerology/TTI/transmission duration due to latency and reliability requirements. In an example, a UE may not multiplex traffic from logical channels that may not be mapped to URLLC numerology/TTI/transmission duration even if there is room for the payload. In an example, an eMBB numerology/TTI/transmission duration may not support QoS required by URLLC service. In an example, RRC may configure UE to multiplex traffic from one or more logical channels to a given numerology based on QoS requirements. In an example, HARQ configuration may be numerology/TTI/transmission duration specific.

In an example, different priorities among logical channels may be applied to the resources within different numerologies and/or TTIs/transmission durations. In an example, a gNB may dynamically indicate the priority among logical channels. In an example, a UE may have a default priority among logical channels. In an example, the gNB may indicate, in an UL grant and/or other DCI, the logical channel that has the highest priority for the UL grant. In an example, a UE may adjust the default priority according to the indication from the gNB. In an example, a UE may adapt logical channel priorities based on an indication of priority information from a gNB.

In an example, gNB may configure one or more of logical channels that may only be mapped to one or more first numerologies/ITTs/transmission durations (e.g., not mapped to numerologies/TTIs/transmission durations other than the one or more first numerologies/TTIs). In an example, a gNB may configure one or more logical channels that may be mapped to any numerologies/TTIs/transmission durations.

In an example, a logical channel may be mapped to one or more numerologies/TTI durations/transmission durations. In an example, ARQ may be performed on one or more numerologies/TTI durations/transmission durations that the LCH is mapped to. In an example, the RLC configuration may be per logical channel and may not depend on numerology/TTI duration/transmission duration. In an example, logical channel to numerology/TTI length/transmission duration mapping may be reconfigured via RRC reconfiguration. In an example, HARQ retransmission may be performed across different numerologies and/or TTI durations/transmission durations. In an example, HARQ configuration may be numerology/TTI duration/transmission duration specific. In an example, a MAC entity may support one or more numerologies/TTI durations/transmission durations.

In an example, relative priorities between and amongst MAC CEs and the logical channels may be configurable by the gNB/network. In an example, a default priority list may be used as baseline. The network may signal a priority list. The UE may override the default priority list. In an example, the dynamic priority list may be cell-specific or UE-specific.

In an example, retransmission of a transport block may consider the mapping of logical channel to one or more numerology/TTI duration/transmission duration. In an example, an uplink grant may be associated with a numerology/TTI duration/transmission duration. For new transmission, MAC PDU may be generated by including logical channels that are mapped to the numerology/TTI duration/transmission duration of the uplink grant. In an example for retransmission, an uplink grant may be associated with a numerology/TTI duration/transmission duration that is commonly mapped to logical channels included in the MAC PDU.

In an example, an uplink grant may be associated with a numerology/TTI duration/transmission duration. The UL grant may indicate one or more numerologies/TTI durations/transmission durations. For new transmission, MAC PDU may be generated by including logical channels that are mapped to the one or more numerologies/TTI durations/transmission durations of the uplink grant. For retransmission, an uplink grant may be associated with a numerology/TTI duration/transmission duration that is commonly mapped to logical channels included in the MAC PDU.

In an example, if the UE receives an uplink grant associated with a numerology/TTI duration/transmission duration that may not be mapped to one of logical channels included in the MAC PDU, the UE may not use the uplink grant, e.g., ignore the uplink grant. In an example, a numerology/TTI durations/transmission durations may be identified by an index. In an example, the index for a numerology/TTI duration/transmission duration may be configured by RRC and/or pre-configured and/or hard-coded.

Figure 16:
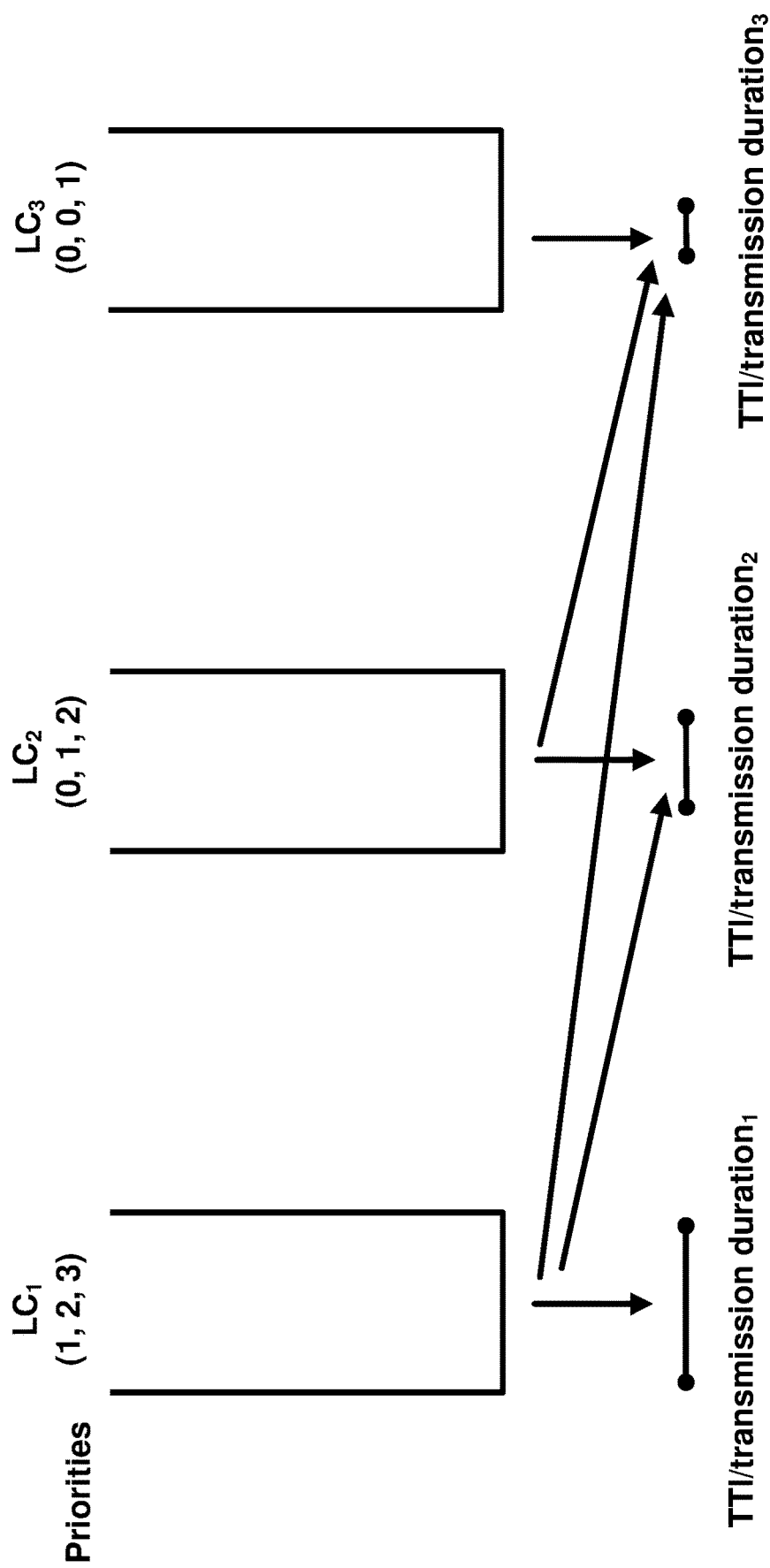
FIG. 16 is a diagram of an example mapping of logical channels to transmission durations as per an aspect of an embodiment of the present disclosure.

In an example, a first logical channel may be assigned at least a first logical channel priority. In an example, the first logical channel may be assigned one or more logical channel priorities for one or more TTIs/transmission durations/numerologies. In an example, the first logical channel may be assigned a logical channel priority for each of the plurality of TTIs/transmission durations/numerologies. In an example, a logical channel may be assigned a logical channel priority for each of one or more of the plurality of TTIs/transmission durations/numerologies. In an example, a logical channel may be assigned a logical channel priority for each of one or more TTIs/transmission durations/numerologies wherein the logical channel is mapped to the each of the one or more TTIs/transmission durations/numerologies. In an example, the one or more messages may comprise one or more second fields indicating priorities of a logical channel on one or more TTIs/transmission durations/numerologies. In an example, the one or more second fields may comprise one or more sequences indicating priorities of a logical channel on one or more TTIs/transmission durations/numerologies. In an example, the one or more second fields may comprise a plurality of sequences for the plurality of logical channels. A sequence corresponding to a logical channel may indicate the priorities of the logical channel on the plurality of TTIs/transmission durations/numerologies/cells or one or more of the plurality of TTIs/transmission durations/numerologies/cells. In an example, the priorities may indicate mapping between a logical channel and one or more TTIs/transmission durations/numerologies. In an example, a priority of a logical channel with a given value (e.g., zero or minus infinity or a negative value) for a TTI/transmission duration/numerology may indicate that the logical channel is not mapped to the TTI/numerology. FIG. 16 illustrates an example with three TTIs/numerologies and three logical channels (LC1, LC2, LC3) wherein LC1 is mapped to TTI/transmission duration 1, TTI/transmission duration 2, and TTI/transmission duration 3 and LC2 is mapped to TTI/transmission duration 2 and TTI/transmission duration 3 and LC3 is mapped to TTI/transmission duration 3. In an example, priorities of LC1 on TTI/transmission duration 1, TTI/transmission duration 2, and TTI/transmission duration 3 may be indicated as (1, 2, 3), priorities of LC2 on TTI/transmission duration 1, TTI/transmission duration 2, and TTI/transmission duration 3 may be indicated as (0, 1, 2), priorities of LC3 on TTI/transmission duration 1, TTI/transmission duration 2, and TTI/transmission duration 3 may be indicated as (0, 0, 1). In an example, sizes of the sequence may be variable. In an example, a size of a sequence associated with a logical channel may be a number of TTIs/transmission durations/numerologies to which the logical channel is mapped. In an example, the sizes of the sequence may be fixed, e.g., the number of TTIs/transmission durations/numerologies/cells.

In an example, a TTI/transmission duration/numerology for a grant (e.g., as indicated by the grant/DCI) may not accept data from one or more logical channels. In an example, the one or more logical channels may not be mapped to the TTI/transmission duration/numerology indicated in the grant. In an example, a logical channel of the one or more logical channels may be configured to be mapped to one or more TTIs/transmission durations/numerologies and the TTI/transmission duration/numerology for the grant may not be among the one or more TTIs/transmission durations/numerologies. In an example, a logical channel of the one or more logical channels may be configured with a max-TTI/transmission duration parameter indicating that the logical channel may not be mapped to a TTI/transmission duration longer than max-TTI/transmission duration, and the grant may be for a TTI/transmission duration longer than max-TTI/transmission duration. In an example, a logical channel may be configured with a min-TTI/transmission duration parameter indicating that the logical channel may not be mapped to a TTI/transmission duration shorter than min-TTI/transmission duration, and the grant may be for a TTI/transmission duration shorter than min-TTI/transmission duration. In an example, a logical channel may not be allowed to be transmitted on a cell and/or one or more numerologies and/or one or more numerologies of a cell. In an example, a logical channel may contain duplicate data and the logical channel may be restricted so that the logical channel is not mapped to a cell/numerology. In an example, the logical channel may not be configured with an upper layer configuration parameter laa-allowed and the cell may be an LAA cell.

Example power control mechanism is described here. Some detailed parameters are provided in examples. The basic processes may be implemented in technologies such as LTE, New Radio, and/or other technologies. A radio technology may have its own specific parameters. Example embodiments describe a method for implementing power control mechanism. Other example embodiments of the invention using different parameters may be implemented.

Some example embodiments enhance physical layer power control mechanisms when some layer 2 parameters are taken into account.

In an example embodiment, downlink power control may determine the Energy Per Resource Element (EPRE). The term resource element energy may denote the energy prior to CP insertion. The term resource element energy may denote the average energy taken over all constellation points for the modulation scheme applied. Uplink power control determines the average power over a SC-FDMA symbol in which the physical channel may be transmitted.

Uplink power control may control the transmit power of the different uplink physical channels. In an example, if a UE is configured with a LAA SCell for uplink transmissions, the UE may apply the procedures described for PUSCH and SRS in this clause assuming frame structure type 1 for the LAA SCell unless stated otherwise.

In an example, for PUSCH, the transmit power $\hat{P}_{PUSCH,c}(i)$, may be first scaled by the ratio of the number of antennas ports with a non-zero PUSCH transmission to the number of configured antenna ports for the transmission scheme. The resulting scaled power may be then split equally across the antenna ports on which the non-zero PUSCH is transmitted. For PUCCH or SRS, the transmit power $\hat{P}_{PUCCH}(i)$, or $\hat{P}_{SRS,c}(i)$ may be split equally across the configured antenna ports for PUCCH or SRS. $\hat{P}_{SRS,c}(i)$ may be the linear value of $P_{SRS,c}(i)$. A cell wide overload indicator (OI) and a High Interference Indicator (HII) to control UL interference may be parameters in LTE technology. In an example, for a serving cell with frame structure type 1, a UE is not expected to be configured with UplinkPowerControlDedicated-v12x0.

In an example, if the UE is configured with a SCG, the UE may apply the procedures described in this disclosure for both MCG and SCG. In an example, When the procedures are applied for MCG, the terms secondary cell, secondary cells, serving cell, serving cells in this clause refer to secondary cell, secondary cells, serving cell, serving cells belonging to the MCG respectively. In an example, when the procedures are applied for SCG, the terms secondary cell, secondary cells, serving cell, serving cells in this disclosure refer to secondary cell, secondary cells (not including PSCell), serving cell, serving cells belonging to the SCG respectively. The term primary cell in this clause may refer to the PSCell of the SCG.

In an example, if the UE is configured with a PUCCH-SCell, the UE may apply the procedures described in this clause for both primary PUCCH group and secondary PUCCH group. In an example, when the procedures are applied for primary PUCCH group, the terms secondary cell, secondary cells, serving cell, serving cells in this clause refer to secondary cell, secondary cells, serving cell, serving cells belonging to the primary PUCCH group respectively. In an example, when the procedures are applied for secondary PUCCH group, the terms secondary cell, secondary cells, serving cell, serving cells in this disclosure refer to secondary cell, secondary cells, serving cell, serving cells belonging to the secondary PUCCH group respectively.

In an example, if the UE transmits PUSCH without a simultaneous PUCCH for the serving cell c, then the UE transmit power $P_{PUSCH,c}(i)$ for PUSCH transmission in subframe i for the serving cell c is given by $$P_{PUSCH,c}(i) = \min\begin{Bmatrix} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix} \text{ [dBm]}$$

In an example, if the UE transmits PUSCH simultaneous with PUCCH for the serving cell c, then the UE transmit power $P_{PUSCH,c}^{(i)}$ for the PUSCH transmission in subframe i for the serving cell c may be given by $$P_{PUSCH,c}(i) = \min\begin{Bmatrix} 10\ \log_{10}(\hat{P}_{CMAX,c}(i) - \hat{P}_{PUCCH}(i)), \\ 10\ \log_{10}(M_{PUSCH,c}(i)) + P_{O\_PUSCH,c}(j) + \alpha_c(j) \cdot PL_c + \Delta_{TF,c}(i) + f_c(i) \end{Bmatrix} \text{ [dBm]}$$

In an example, if the UE is not transmitting PUSCH for the serving cell c, for the accumulation of TPC command received with DCI format 3/3A for PUSCH, the UE may assume that the UE transmit power $P_{PUSCH,c}^{(i)}$ for the PUSCH transmission in subframe i for the serving cell c may be computed by $P_{PUSCH,c}(i) = \min\{P_{CMAX,c}(i), P_{O\_PUSCH,c}(1) + \alpha_c(1) \cdot PL_c + f_c(i)\}$ [dBm]

where, in an example, $P_{CMAX,\ c}(i)$ is the configured UE transmit power in subframe i for serving cell c and $\hat{P}_{CMAX,c}(i)$ may be the linear value of $P_{CMAX,\ c}(i)$. If the UE transmits PUCCH without PUSCH in subframe i for the serving cell c, for the accumulation of TPC command received with DCI format 3/3A for PUSCH, the UE may assume $P_{CMAX,c}(i)$. If the UE does not transmit PUCCH and PUSCH in subframe i for the serving cell c, for the accumulation of TPC command received with DCI format 3/3A for PUSCH, the UE may compute $P_{CMAX,c}(i)$ assuming MPR=0 dB, A-MPR=0 dB, P-MPR=0 dB and TC=0 dB, where MPR, A-MPR, P-MPR and TC may be pre-defined in LTE technology. $\hat{P}_{PUCCH}(i)$ may be the linear value of $P_{PUCCH}(i)$. $M_{PUSCH,\ c}(i)$ may be the bandwidth of the PUSCH resource assignment expressed in number of resource blocks valid for subframe i and serving cell c.

If the UE is configured with higher layer parameter UplinkPowerControlDedicated-v12x0 for serving cell c and if subframe i belongs to uplink power control subframe set 2 as indicated by the higher layer parameter tpc-Subframe-Set-r12, when j=0, $P_{O\_PUSCH,c}(0) = P_{O\_UE\_PUSCH,c,2}(0) + P_{O\_NOMINAL\_PUSCH,c,2}(0)$, where j=0 may be used for PUSCH (re)transmissions corresponding to a semi-persistent grant. $P_{O\_UE\_PUSCH,c,2}(0)$ and $P_{O\_NOMINAL\_PUSCH,c,2}(0)$ may be the parameters p0-UE-PUSCH-Persistent-SubframeSet2-r12 and p0-NominalPUSCH-Persistent-SubframeSet2-r12 respectively provided by higher layers, for each serving cell c. when j=1, $P_{O\_PUSCH,c}(1) = P_{O\_UE\_PUSCH,c,2}(1) + P_{O\_NOMAIL\_PUSCH,c,2}(1)$, where j=1 may be used for PUSCH (re)transmissions corresponding to a dynamic scheduled grant. $P_{O\_UE\_PUSCH,c,2}(1)$ and $P_{O\_NOMINAL\_PUSCH,c,2}(1)$ are the parameters p0-UE-PUSCH-SubframeSet2-r12 and p0-NominalPUSCH-SubframeSet2-r12 respectively, provided by higher layers for serving cell c. when j=2, $P_{O\_PUSCH,c}(2)=P_{O\_UE\_PUSCH,c}(2)+P_{O\_NOMINAL\_PUSCH,c}(2)$ where $P_{O\_UE\_PUSCH,c}(2)=0$ and $P_{O\_NOMINAL\_PUSCH,c}(2)$ $P_{O\_PRE}+\Delta_{PREAMBLE\_Msg3}$, where the parameter preambleInitialReceivedTargetPower ($P_{O\_PRI}$) and $\Delta_{PREAMBLE\_Msg3}$ may be signalled from higher layers for serving cell c, where j=2 may be used for PUSCH (re)transmissions corresponding to the random access response grant.

Otherwise, $P_{O\_PUSCH,\ c}(j)$ is a parameter composed of the sum of a component $P_{O\_NOMINAL\_PUSCH,\ c}(j)$ provided from higher layers for j=0 and 1 and a component $P_{O\_UE\_PUSCH,c}(j)$ provided by higher layers for j=0 and 1 for serving cell c. For PUSCH (re)transmissions corresponding to a semi-persistent grant then j=0, for PUSCH (re)transmissions corresponding to a dynamic scheduled grant then j=1 and for PUSCH (re)transmissions corresponding to the random access response grant then j=2. $P_{O\_UE\_PUSCH,c}(2)=0$ and $P_{O\_NOMINAL\_PUSCH,\ c}(2)=P_{O\_PRE}+\Delta_{PREAMBLE\_Msg\ 3}$, where the parameter preambleInitialReceivedTargetPower ($P_{O\_PRI}$) and $\Delta_{PREAMBLE\_Msg3}$ may be signalled from higher layers for serving cell c.

In an example, if the UE is configured with higher layer parameter UplinkPowerControlDedicated-v12x0 for serving cell c and if subframe i belongs to uplink power control subframe set 2 as indicated by the higher layer parameter tpc-SubframeSet-r12, for j=0 or 1, $\alpha_c(j)=\alpha_{c,2}\in\{0,0.4,0.5 0.6, 0.7,0.8,0.9,1\}$. $\alpha_{c,2}$ is the parameter alpha-SubframeSet2-r12 provided by higher layers for each serving cell c. For j=2, $\alpha_c(j)=1$. Otherwise, for j=0 or 1, $\alpha_c\mathring{A}\{0,\ 0.4,\ 0.5,\ 0.6,\ 0.7, 0.8,\ 0.9,\ 1\}$ may be a 3-bit parameter provided by higher layers for serving cell c. For j=2, $\alpha_c(j)=1$.

In an example, $PL_c$ may be the downlink path loss estimate calculated in the UE for serving cell c in dB and $PL_c$=referenceSignalPower−higher layer filtered RSRP, where referenceSignalPower may be provided by higher layers and RSRP for the reference serving cell and the higher layer filter configuration for the reference serving cell. If serving cell c belongs to a TAG containing the primary cell then, for the uplink of the primary cell, the primary cell may be used as the reference serving cell for determining referenceSignalPower and higher layer filtered RSRP. For the uplink of the secondary cell, the serving cell configured by the higher layer parameter pathlossReferenceLinking may be used as the reference serving cell for determining referenceSignalPower and higher layer filtered RSRP. If serving cell c belongs to a TAG containing the PSCell then, for the uplink of the PSCell, the PSCell may be used as the reference serving cell for determining referenceSignalPower and higher layer filtered RSRP; for the uplink of the secondary cell other than PSCell, the serving cell configured by the higher layer parameter pathlossReferenceLinking may be used as the reference serving cell for determining referenceSignalPower and higher layer filtered RSRP. If serving cell c belongs to a TAG not containing the primary cell or PSCell then serving cell c is used as the reference serving cell for determining referenceSignalPower and higher layer filtered RSRP.

In an example, for $\Delta_{TF,c}(i)=10\ \log_{10}((2^{BPRE\cdot K_s}-1)\cdot \beta_{offset}^{PUSCH})$ for $K_S=1.25$ and 0 for $K_S=0$ where $K_S$ may be given by the parameter deltaMCS-Enabled provided by higher layers for each serving cell c. BPRE and $\beta_{offset}^{PUSCH}$, for each serving cell, c may be computed as below. $K_S=0$ for transmission mode 2. BPRE=$O_{CQI}/N_{RE}$ for control data sent via PUSCH without UL-SCH data and $$\sum_{r=0}^{C-1} K_r/N_{RE}$$

for other cases. In an example, C may be the number of code blocks, $K_r$ may be the size for code block r, $O_{CQI}$ may be the number of CQI/PMI bits including CRC bits and $N_{RE}$ may be the number of resource elements determined as $N_{RE}=M_{sc}^{PUSCH-initial}\cdot N_{symb}^{PUSCH-initial}$, where C, $K_r$, $M_{sc}^{PUSCH-initial}$ and $N_{symb}^{PUSCH-initial}$. $\beta_{offset}^{PUSCH}=\beta_{offset}^{CQI}$ for control data sent via PUSCH without UL-SCH data and 1 for other cases.

In an example, $\beta_{PUSCH,\ c}$ may be a correction value, also referred to as a TPC command and may be included in PDCCH/EPDCCH with DCI format 0/0A/0B/4/4A/4B or in MPDCCH with DCI format 6-0A for serving cell c or jointly coded with other TPC commands in PDCCH/MPDCCH with DCI format 3/3A whose CRC parity bits may be scrambled with TPC-PUSCH-RNTI. If the UE may be configured with higher layer parameter UplinkPowerControlDedicated-v12x0 for serving cell c and if subframe i belongs to uplink power control subframe set 2 as indicated by the higher layer parameter tpc-SubframeSet-r12, the current PUSCH power control adjustment state for serving cell c is given by $f_{c,2}(i)$, and the UE may use $f_{c,2}(i)$ instead of $f_c(i)$ to determine $P_{PUSCH,c}(i)$. Otherwise, the current PUSCH power control adjustment state for serving cell c is given by $f_c(i)$. $f_{c,2}(i)$ and $f_c(i)$ may be defined by:

In an example, $f_c(i)=f_c(i-1)+\delta_{PUSCH,\ c}(i-K_{PUSCH})$ and $f_{c,2}(i)=f_{c,2}(i-1)+\delta_{PUSCH,c}(i-K_{PUSCH})$ if accumulation may be enabled based on the parameter Accumulation-enabled provided by higher layers or if the TPC command $\delta_{PUSCH,\ c}$ may be included in a PDCCH/EPDCCH with DCI format 0 or in a MPDCCH with DCI format 6-0A for serving cell c where the CRC may be scrambled by the Temporary C-RNTI, where $\delta_{PUSCH,c}(i-K_{PUSCH})$ was signalled on PDCCH/EPDCCH with DCI format 0/0A/0B/4/4A/4B or MPDCCH with DCI format 6-0A or PDCCH/MPDCCH with DCI format 3/3A on subframe i−$K_{PUSCH}$, and where $f_c(0)$ may be the first value after reset of accumulation. For a BL/CE UE configured with CEModeA, subframe i−$K_{PUSCH}$ may be the last subframe in which the MPDCCH with DCI format 6-0A or MPDCCH with DCI format 3/3A may be transmitted. The value of $K_{PUSCH}$ is predefined based on frame structure and/or link parameters. For serving cell c and a non-BL/CE UE, the UE attempts to decode a PDCCH/EPDCCH of DCI format 0/0A/0B/4/4A/4B with the UE's C-RNTI or DCI format 0 for SPS C-RNTI or DCI format 0 for UL-V-SPS-RNTI and a PDCCH of DCI format 3/3A with this UE's TPC-PUSCH-RNTI in every subframe except when in DRX or where serving cell c may be deactivated. For serving cell c and a BL/CE UE configured with CEModeA, the UE attempts to decode a MPDCCH of DCI format 6-0A with the UE's C-RNTI or SPS C-RNTI and a MPDCCH of DCI format 3/3A with this UE's TPC-PUSCH-RNTI in every BL/CE downlink subframe except when in DRX. For a non-BL/CE UE, if DCI format 0/0A/0B/4/4A/4B for serving cell c and DCI format 3/3A may be both detected in the same subframe, then the UE may use the $\delta_{PUSCH,\ c}$ provided in DCI format 0/0A/0B/4/4A/4B. For a BL/CE UE configured with CEModeA, if DCI format 6-0A for serving cell c and DCI format 3/3A may be both detected in the same subframe, then the UE may use the $\delta_{PUSCH,\ c}$ provided in DCI format 6-0A. $\delta_{PUSCH,\ c}=0$ dB for a subframe where no TPC command may be decoded for serving cell c or where DRX occurs or i may be not an uplink subframe in TDD or FDD-TDD and serving cell c frame structure type 2. $\delta_{PUSCH, c}$=0 dB if the subframe i may be not the first subframe scheduled by a PDCCH/EPDCCH of DC format 0B/4B. The $\delta_{PUSCH, c}$ dB accumulated values signalled on PDCCH/EPDCCH with DCI format 0/0A/0B/4/4A/4B or MPDCCH with DCI format 6-0A may be given in a table. If the PDCCH/EPDCCH with DCI format 0 or MPDCCH with DCI format 6-0A may be validated as a SPS activation or release PDCCH/EPDCCH/MPDCCH, then $\delta_{PUSCH, c}$ may be 0 dB. The $\delta_{PUSCH}$ dB accumulated values signalled on PDCCH/MPDCCH with DCI format 3/3A may be one of SET1 given in a table or SET2 given in a table as determined by the parameter TPC-Index provided by higher layers. In an example, if UE has reached $P_{CMAX, c}^{(i)}$ for serving cell c, positive TPC commands for serving cell c may not be accumulated. In an example, if UE has reached minimum power, negative TPC commands may not be accumulated.

If the UE may be not configured with higher layer parameter UplinkPowerControlDedicated-v12x0 for serving cell c, the UE may reset accumulation, for serving cellc, when $P_{O\_UE\_PUSCH,c}$ value may be changed by higher layers. For serving cell c, when the UE receives random access response message for serving cell c.

In an example, if the UE is configured with higher layer parameter UplinkPowerControlDedicated-v12x0 for serving cell c, the UE may reset accumulation corresponding to $f_c(*)$ for serving cell c or when the UE receives random access response message for serving cell c. The UE may reset accumulation corresponding to $f_{c,2}(*)$ for serving cell c, when $P_{O\_UE\_PUSCH,c,2}$ value may be changed by higher layers.

In an example, if the UE is configured with higher layer parameter UplinkPowerControlDedicated-v12x0 for serving cell c and if subframe i belongs to uplink power control subframe set 2 as indicated by the higher layer parameter tpc-SubframeSet-r12 $f_c(i)=f_c(i-1)$.

In an example, if the UE is configured with higher layer parameter UplinkPowerControlDedicated-v12x0 for serving cell c and if subframe $^i$ does not belong to uplink power control subframe set 2 as indicated by the higher layer parameter tpc-SubframeSet-r12 $f_{c,2}(i)=f_{c,2}(i-1)$.

In an example, $f_c(i)=\delta_{PUSCH, c}(i-K_{PUSCH})$ and $f_{c,2}(i)=\delta_{PUSCH,c}(i-K_{PUSCH})$ if accumulation may be not enabled for serving cell c based on the parameter Accumulation-enabled provided by higher layers where $\delta_{PUSCH, c}(i-K_{PUSCH})$ was signalled on PDCCH/EPDCCH with DCI format 0/0A/0B/4/4A/4B or MPDCCH with DCI format 6-0A for serving cell, on subframe $i-K_{PUSCH}$. For a BL/CE UE configured with CEModeA, subframe $i-K_{PUSCH}$ may be the last subframe in which the MPDCCH with DCI format 6-0A or MPDCCH with DCI format 3/3A may be transmitted. The value of $K_{PUSCH}$ is a predefined depending on frame structure and other link parameters. The $\delta_{PUSCH, c}$ dB absolute values signalled on PDCCH/EPDCCH with DC format 0/0A/0B/4/4A/4B or a MPDCCH with DCI format 6-0A may be given in a table. If the PDCCH/EPDCCH with DCI format 0 or a MPDCCH with DCI format 6-0A may be validated as a SPS activation or release PDCCH/EPDCCH/MPDCCH, then $\delta_{PUSCH, c}$ may be 0 dB. For a non-BL/CE UE, $f_c(i)=f_c(i-1)$ and $f_{c,2}(i)=f_{c,2}(i-1)$ for a subframe where no PDCCH/EPDCCH with DCI format 0/0A/0B/4/4A/4B may be decoded for serving cell c or where DRX occurs or i may be not an uplink subframe in TDD or FDD-TDD and serving cell c frame structure type 2. For a BL/CE UE configured with CEModeA, $f_c(i)=f_c(i-1)$ and $f_{c,2}(i)=f_{c,2}(i-1)$ for a subframe where no MPDCCH with DCI format 6-0A may be decoded for serving cell c or where DRX occurs or i may be not an uplink subframe in TDD.

In an example, if the UE is configured with higher layer parameter UplinkPowerControlDedicated-v12x0 for serving cell c and if subframe $^i$ belongs to uplink power control subframe set 2 as indicated by the higher layer parameter tpc-SubframeSet-r12 $f_c(i)=f_c(i-1)$. In an example, if the UE is configured with higher layer parameter UplinkPowerControlDedicated-v12x0 for serving cell c and if subframe $^i$ does not belong to uplink power control subframe set 2 as indicated by the higher layer parameter tpc-SubframeSet-r12 $f_{c,2}(i)=f_{c,2}(i-1)$.

In an example, for both types of $f_c(*)$ (accumulation or current absolute) the first value may be set as follows: If $P_{O\_UE\_PUSCH,c}$ value is changed by higher layers and serving cell c is the primary cell or, if $P_{O\_UE\_PUSCH,c}$ value may be received by higher layers and serving cell c may be a Secondary cell, $f_c(0)=0$. Else, If the UE receives the random access response message for a serving cell c, $f_c(0)=\Delta P_{rampup,c}+\delta_{msg2,c}$ where $\delta_{msg2,c}$ may be the TPC command indicated in the random access response corresponding to the random access preamble transmitted in the serving cell c, and $\Delta P_{rampupc}$ and $\Delta P_{rampuprequested,c}$ may be provided by higher layers and corresponds to the total power ramp-up requested by higher layers from the first to the last preamble in the serving cell c, $M_{PUSCH,c}(0)$ is the bandwidth of the PUSCH resource assignment expressed in number of resource blocks valid for the subframe of first PUSCH transmission in the serving cell c, and $\Delta TF,c(0)$ may be the power adjustment of first PUSCH transmission in the serving cell c. In an example, if $P_{O\_UE\_PUSCH,c,2}$ value is received by higher layers for a serving cell c, $f_{c,2}(0)=0$.

In an example, if the UE is not configured with a SCG or a PUCCH-SCell, and if the UE is configured with multiple TAGs, and if the PUCCH/PUSCH transmission of the UE on subframe i for a given serving cell in a TAG overlaps some portion of the first symbol of the PUSCH transmission on subframe i+1 for a different serving cell in another TAG the UE may adjust its total transmission power to not exceed $P_{CMAX}$ on any overlapped portion.

In an example, if the UE is not configured with a SCG or a PUCCH-SCell, and if the UE is configured with multiple TAGs, and if the PUSCH transmission of the UE on subframe i for a given serving cell in a TAG overlaps some portion of the first symbol of the PUCCH transmission on subframe i+1 for a different serving cell in another TAG the UE may adjust its total transmission power to not exceed $P_{CMAX}$ on any overlapped portion.

In an example, if the UE is not configured with a SCG or a PUCCH-SCell, and if the UE is configured with multiple TAGs, and if the SRS transmission of the UE in a symbol on subframe i for a given serving cell in a TAG overlaps with the PUCCH/PUSCH transmission on subframe i or subframe i+1 for a different serving cell in the same or another TAG the UE may drop SRS if its total transmission power exceeds $P_{CMAX}$ on any overlapped portion of the symbol.

In an example, if the UE is not configured with a SCG or a PUCCH-SCell, and if the UE is configured with multiple TAGs and more than 2 serving cells, and if the SRS transmission of the UE in a symbol on subframe i for a given serving cell overlaps with the SRS transmission on subframe i for a different serving cell(s) and with PUSCH/PUCCH transmission on subframe i or subframe i+1 for another serving cell(s) the UE may drop the SRS transmissions if the total transmission power exceeds $P_{CMAX}$ on any overlapped portion of the symbol.

In an example, if the UE is not configured with a SCG or a PUCCH-SCell, and if the UE is configured with multiple TAGs, the UE may, when requested by higher layers, to transmit PRACH in a secondary serving cell in parallel with SRS transmission in a symbol on a subframe of a different serving cell belonging to a different TAG, drop SRS if the total transmission power exceeds $P_{CMAX}$ on any overlapped portion in the symbol.

In an example, if the UE is not configured with a SCG or a PUCCH-SCell, and if the UE is configured with multiple TAGs, the UE may, when requested by higher layers, to transmit PRACH in a secondary serving cell in parallel with SRS transmission in a symbol on a subframe of a different serving cell belonging to a different TAG, drop SRS if the total transmission power exceeds $P_{CMAX}$ on any overlapped portion in the symbol.

In an example, if the UE is not configured with a SCG or a PUCCH-SCell, and the UE is configured with multiple TAGs, the UE may, when requested by higher layers, to transmit PRACH in a secondary serving cell in parallel with PUSCH/PUCCH in a different serving cell belonging to a different TAG, adjust the transmission power of PUSCH/PUCCH so that its total transmission power does not exceed $P_{CMAX}$ on the overlapped portion.

In an example, if the UE is configured with a LAA SCell for uplink transmissions, the UE may compute the scaling factor w(i) assuming that the UE performs a PUSCH transmission on the LAA SCell in subframe i irrespective of whether the UE can access the LAA SCell for the PUSCH transmission in subframe i according to the channel access procedures.

For a BL/CE UE configured with CEModeA, if the PUSCH is transmitted in more than one subframe i0, i1, . . . , iN−1 where i0<i1< . . . <iN−1, the PUSCH transmit power in subframe ik, k=0, 1, . . . , N−1, may be determined by $P_{PUSCH,c}(i_k)=P_{PUSCH,c}(i_0)$.

In an example, cells of different bands and/or technologies may be grouped, and a cell group may be configured with a first transmit power value (e.g. maximum transmit power). For example, cells in LAA bands, cells in UWB, cells of certain technology bands may be grouped and may share a configured transmit power. In an example embodiment, $\hat{P}_{CMAX}(i)$ may correspond to cells in a group of cells and a total transmit power may correspond to signals transmitted via cells in the group. In an example, power grouping may not be performed, and $\hat{P}_{CMAX}(i)$ may correspond to all configured and activated cells. When $\hat{P}_{CMAX}(i)$ is assigned to a group of cells, example embodiments may be applied to packets and signals transmitted in a same group of cells. For example, a first group of cells may be configured with a first transmission power value, a second group of cells may be configured with a second transmission power value. In an example, an eNB may transmit to a UE one or more messages comprising configuration parameters indicating the first and second transmission power values.

In an example, cells in the first group and the second group may share the same transmission power. Cells within a first group may be assigned a higher power priority than cells in a second group according to a pre-defined rule and/or RRC configuration parameters. For example, licensed cells may be assigned a higher power priority than unlicensed and/or LAA cells. When cell groups are configured with different power priorities, transmission power of one or more signals transmitted via cells with a higher power priority may be scaled down or dropped if there is not sufficient power for the cells of the high priority group. In an example, a combination of power priority of cells and power priority of signals may be employed. For example, an SRS signal of a higher power priority cell may be configured with a lower power priority compared with a data signal of another cell with a lower power priority.

In an example embodiment (e.g. when the UE is not configured with an SCG or a PUCCH-SCell), if a total transmit power of the UE would exceed $\hat{P}_{CMAX}(i)$, the UE scales $\hat{P}_{PUSCH}(i)$ for the serving cell c in subframe i such that the condition $$\sum_c w(i) \cdot \hat{P}_{PUSCH,c}(i) \leq (\hat{P}_{CMAX}(i) - \hat{P}_{PUCCH}(i))$$

is satisfied where $\hat{P}_{PUCCH}(i)$ may be the linear value of $P_{PUCCH}(i)$, $\hat{P}_{PUSCH,c}(i)$ may be the linear value of $P_{PUSCH,c}(i)$, $\hat{P}_{CMAX}(i)$ may be the linear value of the UE total configured maximum output power $P_{CMAX}$ in subframe i and w(i) may be a scaling factor of $\hat{P}_{PUSCH,c}(i)$ for serving cell c where 0≤w(i)≤1. In case there may be no PUCCH transmission in subframe i $\hat{P}_{PUCCH}(i)=0$.

In an example (e.g. when the UE is not configured with an SCG or a PUCCH-SCell), and a total transmit power of the UE would exceed $\hat{P}_{CMAX}(i)$, the UE may scale $\hat{P}_{PUSCH,c}(i)$ for one or more serving cell in subframe i such that the condition $$\sum_{c \neq j} w(i) \cdot \hat{P}_{PUSCH,c}(i) \leq (\hat{P}_{CMAX}(i) - \hat{P}_{PUSCH,j}(i))$$

is satisfied. In an example, $\hat{P}_{PUSCH,j}(i)$ may be the PUSCH transmit power for the cell with UCI. In an example, $\hat{P}_{PUSCH,j}(i)$ may be the power of PUSCH transmitting a TB of a specific logical channel and/or service (e.g. URLLC packet). w(i) is a scaling factor of $\hat{P}_{PUSCH,c}(i)$ for serving cell c. In this case, no power scaling may be applied to $\hat{P}_{PUSCH,j}(i)$ unless $$\sum_{c \neq j} w(i) \cdot \hat{P}_{PUSCH,c}(i) = 0$$

and a total transmit power of the UE still would exceed $\hat{P}_{CMAX}(i)$. In an example, PUSCH without UCI may be assigned a lower power priority compared with PUSCH with UCI.

In an example (e.g. when the UE is not configured with an SCG or a PUCCH-SCell), if the UE has simultaneous PUCCH and PUSCH with high priority on serving cell j and PUSCH transmission with low priority in any of the remaining serving cells, and the total transmit power of the UE would exceed $\hat{P}_{CMAX}(i)$, the UE obtains $\hat{P}_{PUSCH,c}(i)$ according to $$\hat{P}_{PUSCH,j}(i) = \min(\hat{P}_{PUSCH,j}(i), (\hat{P}_{CMAX}(i) - \hat{P}_{PUCCH}(i))) \text{ and}$$

$$\sum_{c \neq j} w(i) \cdot \hat{P}_{PUSCH,c}(i) \leq (\hat{P}_{CMAX}(i) - \hat{P}_{PUCCH}(i) - \hat{P}_{PUSCH,j}(i))$$

The NR radio access network supports a wide range of service types with different requirements. Some service types (e.g., URLLC) have strict requirements in terms of latency and reliability. A dropping of packets containing URLLC data may be detrimental in terms of safety or quality of service. The legacy power control algorithms may lead to scaling or dropping of packets (e.g., packets containing URLLC data) and the packets may not be detectable by the base station. This may have severe consequences and may lead to poor performance of certain service types (e.g., URLLC). There is a need to enhance power control mechanisms for URLLC or other QoS-sensitive data. Embodiments enhance the power control/adjustment processes for URLLC or other QoS-sensitive services.

In an example, w(i) may depend at least on one or more of the following parameters: logical channel priority, service type, cell type, and/or at least one cell configuration parameter. In an example embodiment, a service and/or logical channel (e.g. URLCC) may be assigned a power priority higher than other logical channels. For example, when the UE is power limited, the UE may not scale the power of URLLC transport block (e.g. w=1), and may scale or drop the power of one or more other logical channels with lower power priority. In an example, URLLC power may be scaled down after other logical channel packets are dropped due to the UE not having enough transmit power.

In an example, an eNB may transmit one or more messages comprising configuration parameters of a plurality of cells and a plurality of logical channels. The configuration parameters may comprise one or more parameters indicating a power priority for a logical channel, a service type, cell type, and/or a cell. Uplink power control mechanism may consider power priorities into account to calculate the W(i) factors for different signals when a calculated total power exceeds a first value, e.g. when the UE does not have enough transmit power to transmit the signals with a calculated transmission power. The UE may scale down or drop one or more signals according to the power priorities configured for a signal.

In an example, one or more logical channels with a configured power priority (e.g. URLCC) may have a higher power priority than $\hat{P}_{PUSCH,j}(i)$, the PUSCH transmit power for the cell with UCI. In an example, e.g. URLCC may have a lower power priority than $\hat{P}_{PUSCH,j}(i)$, the PUSCH transmit power for the cell with UCI.

In an example, w(i) values may be the same for one or more serving cells or one or more logical channels when w(i)>0. w(i) may be zero for one or more cells when the uplink signal is dropped and not transmitted.

In an example embodiment, when a TB PDU includes data from multiple logical channels with different priorities, the priority of the TB PDU may be the priority of the data with the highest priority. For example, when URLCC and other low priority date are multiplexed within a PDU, the priority of the PDU may be the same as the URLCC.

In an example embodiment, one or more PUSCH transmission may be configured with a higher power priority compared with power priority of one or more of the following signals: PUCCH signal, PUSCH with UCI signals and/or at least one RAP. In an example embodiment (e.g. when the UE is not configured with an SCG or a PUCCH-SCell), if the total transmit power of the UE would exceed $\hat{P}_{CMAX}(i)$, the UE scales $\hat{P}_{PUSCH,c}(i)$ for the serving cell c in subframe i such that the condition $$\hat{P}_{PUCCH}(i) \le \left( \hat{P}_{CMAX}(i) - \sum_{c1} \cdot v(i) \hat{P}_{PUSCH,c1}(i) \right)$$

$$\sum_c w(i) \cdot \hat{P}_{PUSCH,c}(i) \le \left( \hat{P}_{CMAX}(i) - \hat{P}_{PUCCH}(i) - \sum_{c1} v(i) \hat{P}_{PUSCH,c1}(i) \right)$$

is satisfied where $\hat{P}_{PUCCH}(i)$ may be the linear value of $P_{PUCCH}(i)$, $\hat{P}_{PUSCH,c}(i)$ may be the linear value of $P_{PUSCH,c}(i)$, $\hat{P}_{CMAX}(i)$ may be the linear value of the UE total configured maximum output power $P_{CMAX}$ in subframe i and w(i) may be a scaling factor of $\hat{P}_{PUSCH,c}(i)$ for serving cell c where 0≤w(i)≤1. In case there may be no PUCCH transmission in subframe i $\hat{P}_{PUCCH}(i)=0$. V(i) may be an scaling power. v(i) may be 1, when no power scaling is used for the corresponding signal.

In an example (e.g. when the UE is not configured with an SCG or a PUCCH-SCell), and a total transmit power of the UE would exceed $\hat{P}_{MAX}(i)$, the UE may scale $\hat{P}_{PUSCH,c}(i)$ for one or more serving cell in subframe i such that the condition $$\sum_{c \ne j} w(i) \cdot \hat{P}_{PUSCH,c}(i) \le$$

$$\left( \hat{P}_{CMAX}(i) - \hat{P}_{PUSCH,j}(i) - \hat{P}_{PUCCH}(i) - \sum_{c1} v(i) \hat{P}_{PUSCH,c1}(i) \right)$$

is satisfied. In an example, $\hat{P}_{PUSCH,j}(i)$ may be the PUSCH transmit power for the cell with UCI.

In an example, $\hat{P}_{PUSCH,j}(i)$ may be the power of PUSCH transmitting a TB of a specific logical channel and/or service (e.g. URLLC packet). w(i) is a scaling factor of $\hat{P}_{PUSCH,c}(i)$ for serving cell c. In this case, no power scaling may be applied to $\hat{P}_{PUSCH,j}(i)$ unless $$\sum_{c \ne j} w(i) \cdot \hat{P}_{PUSCH,c}(i) = 0$$

and a total transmit power of the UE still would exceed $\hat{P}_{CMAX}(i)$. In an example, PUSCH without UCI may be assigned a lower power priority compared with PUSCH with UCI.

In an example, w(i) may depend at least on one or more of the following parameters: logical channel priority, service type, cell type, and/or at least one cell configuration parameter. In an example embodiment, a service and/or logical channel (e.g. URLCC) may be assigned a power priority above other logical channels. For example, when the UE is power limited, the UE may not scale the power of URLLC transport block (e.g. w=1), and may scale or drop the power of one or more other logical channels with lower power priority. In an example, URLLC power may be scaled down after other logical channel packets are dropped due to the UE not having enough transmit power.

In an example, an eNB may transmit one or more messages comprising configuration parameters of a plurality of cells and a plurality of logical channels. The configuration parameters may comprise one or more parameters indicating a power priority for a logical channel, a service type, cell type, and/or a cell. Uplink power control mechanism may consider power priorities into account to calculate the W(i) factors for different signals when a calculated total power exceeds a first value, e.g. when the UE does not have enough transmit power to transmit the signals with a calculated transmission power. The UE may scale down or drop one or more signals according to the power priorities configured for a signal.

In an example, one or more logical channels with a configured power priority (e.g. URLCC) may have a higher power priority than $\hat{P}_{PUSCH,j}(i)$, the PUSCH transmit power for the cell with UCI. In an example, e.g. URLCC may have a lower power priority than $\hat{P}_{PUSCH,j}(i)$, the PUSCH transmit power for the cell with UCI.

In an example, w(i) values may be the same in one or more serving cells when w(i)>0. w(i) may be zero for one or more cells when the uplink signal is dropped and not transmitted.

In an example embodiment, at least one random access preamble (RAP) may be transmitted in parallel with other uplink signals. In an example, at least one RAP may be configured with a higher transmit power priority compared with other signals, e.g. SRS, or uplink data. The power of RAP may remain substantially constant during the RAP transmission.

In an example, the power priority of a higher priority signal (e.g. URLCC) compared with a power priority of RAP signal may depend on cell configuration, the cell via which the preamble is transmitted, and or RRC configuration parameters. For example, URLLC power may be assigned a higher priority compared with a RAP signal (e.g. transmitted on a secondary cell). In an example, RAP signal on a secondary cell may be configured with a lower power priority than a RAP signal transmitted on a primary cell.

Figure 17:
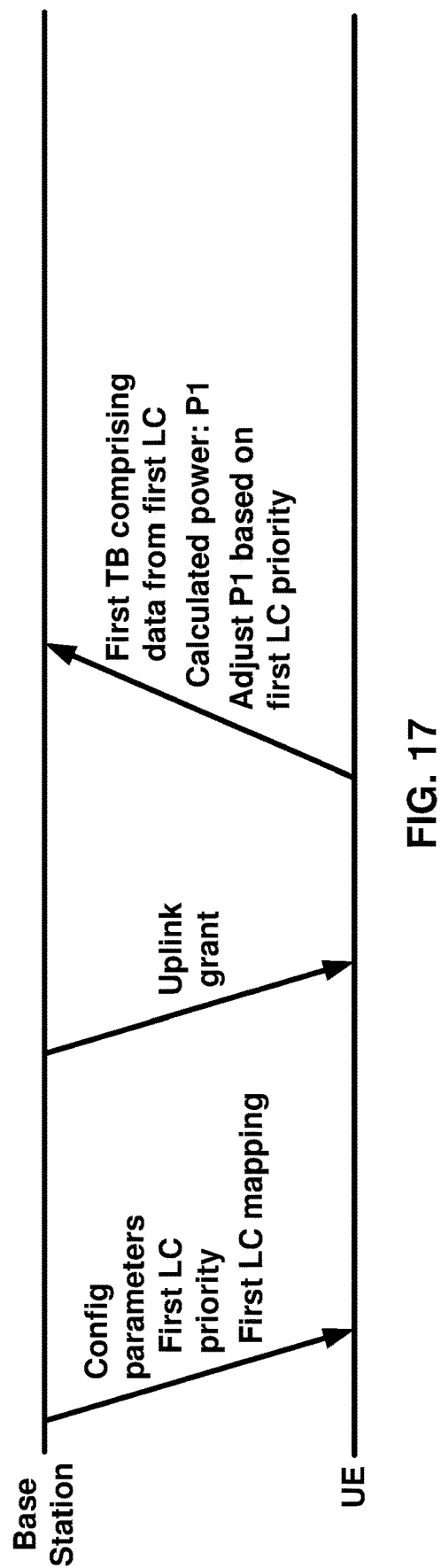
FIG. 17 is a diagram of an example power adjustment as per an aspect of an embodiment of the present disclosure.

In an example, embodiment as shown in FIG. 17, a wireless device may receive one or more messages comprising configuration parameters. The one or more messages may comprise configuration parameters for a plurality of logical channels. The plurality of logical channels may comprise a first logical channel. In an example, the first logical channel may correspond to ultra-reliable low-latency communication (URLLC) service type. In an example, the configuration parameters may indicate a first logical channel priority for the first logical channel. In an example, the configuration parameters may indicate a mapping of the first logical channel to one or more transmission durations. In an example the configuration parameters may indicate a maximum transmission duration for the first logical channel. The first logical channel may be mapped to one or more transmission durations smaller than the maximum transmission duration. In an example, the wireless device may receive an uplink grant indicating radio resources. The uplink grant may be associated with a first transmission duration. The wireless device may multiplex data from one or more logical channels, comprising the first logical channel, into a first transport block in response to the first duration being one of the one or more transmission durations. The wireless device may use a logical channel prioritization procedure to multiplex data from the one or more logical channels, comprising the first logical channel, into the first transport block.

In an example, the wireless device may calculate a transmission power for transmission of the first transport block (e.g., employing one or more parameters in the uplink grant). The wireless device may be configured to transmit a plurality of signals comprising the first transport block. In an example, a signal in the plurality of signals may be transmitted by a physical uplink control channel. In an example, a signal in the plurality of signals may be transmitted via a physical random access channel. A calculated total transmission power (e.g., of the plurality of signals) may be above a first value. In an example, the one or more messages may comprise a field indicating the first value. In an example, in response to the calculated total transmission power being above the first value, the wireless device may adjust the transmission power of one or more signals, comprising the first transport block, in the plurality of signals. The wireless device may adjust the transmission power of the first transport block based on the first logical channel priority of the first logical channel. In an example, the adjusted transmission power of the first transport block may be smaller than a calculated transmission power of the first transport block. In an example, the adjusted transmission power of the first transport block may be the calculated transmission power of the first transport block. The wireless device may transmit the first transport block via the radio resources indicated in the uplink grant. In an example, the wireless device may transmit the first transport block via physical uplink shared channel.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

FIG. 18 is an example flow diagram as per an aspect of an embodiment of the present disclosure. At 1810, a wireless device may receive one or more messages comprising configuration parameters for a plurality of logical channels comprising a first logical channel. The configuration parameters may indicate: a first logical channel priority for the first logical channel; and a mapping of the first logical channel to one or more transmission durations. At 1820, an uplink grant indicating radio resources associated with a first transmission duration may be received. At 1830, data from the first logical channel may be multiplexed into a first transport block in response to the first transmission duration being one of the one or more transmission durations. At 1840, a transmission power of the first transport block, may be adjusted based on the first logical channel priority in response to a calculated total transmission power being above a first value. At 1850, the first transport block may be transmitted via the radio resources.

According to an embodiment, the calculated total transmission power may be a sum of calculated power levels of a plurality of signals comprising the first transport block. According to an embodiment, a first signal in the plurality of signals may be transmitted via physical uplink control channel. According to an embodiment, a second signal in the plurality of signals may be transmitted via physical random access channel. According to an embodiment, the one or more messages may indicate the first level. According to an embodiment, the first logical channel may correspond to an ultra-reliable low-latency communications service type. According to an embodiment, an adjusted transmission power of the first transport block may be a calculated power of the first transport block. According to an embodiment, an adjusted transmission power of the first transport block may be smaller than a calculated power of the first transport block. According to an embodiment, the first transport block may be transmitted via a physical uplink shared channel. According to an embodiment, the configuration parameters may indicate mapping of the first logical channel to one or more transmission durations up to a first duration.

FIG. 19 is an example flow diagram as per an aspect of an embodiment of the present disclosure. At 1910, a wireless device may receive one or more messages comprising configuration parameters for a plurality of logical channels comprising a first logical channel. The configuration parameters may indicate: a first logical channel priority for the first logical channel; and a mapping of the first logical channel to one or more transmission durations. At 1920, an uplink grant indicating radio resources associated with a first transmission duration may be received. At 1930, data from the first logical channel may be multiplexed into a first transport block in response to the first transmission duration being one of the one or more transmission durations. At 1940, a configured transmission of the first transport block may be dropped based on the first logical channel priority in response to a calculated total transmission power being above a first value. The calculated total transmission power may be a sum of a first calculated power level of the first transport block and second calculated power levels of one or more signals. At 1950, the one or more signals may be transmitted.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMath-Script. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
    receiving, by a wireless device, a grant indicating radio resources for transmission of a transport block via a first cell, wherein the radio resources overlap in time with a configured transmission of a preamble via a second cell;
    adjusting, based on a power priority of the preamble, a transmission power of one of the preamble or the transport block, wherein the power priority of the preamble is:
        higher than a power priority of the transport block based on the second cell being a primary cell; and
        lower than the power priority of the transport block based on the second cell being a secondary cell; and
    transmitting the transport block via the radio resources.

2. The method of claim 1, further comprising receiving one or more messages comprising configuration parameters for a plurality of logical channels comprising a first logical channel, wherein the configuration parameters indicate:
    a first logical channel priority for the first logical channel; and
    a mapping of the first logical channel to one or more transmission durations.

3. The method of claim 2, further comprising multiplexing data from the first logical channel into the transport block.

4. The method of claim 1, wherein the adjusting is in response to a calculated total transmission power being above a value.

5. The method of claim 4, wherein the calculated total transmission power is a sum of calculated power levels of a plurality of signals comprising the transport block.

6. The method of claim 5, wherein a first signal in the plurality of signals is transmitted via a physical uplink control channel.

7. The method of claim 5, wherein a second signal in the plurality of signals is transmitted via a physical random access channel.

8. The method of claim 1, wherein the adjusting the transmission power further comprises adjusting the transmission power of the preamble based on the second cell being the secondary cell.

9. The method of claim 1, wherein an adjusted transmission power of the preamble is zero.

10. The method of claim 1, wherein an adjusted transmission power of the preamble is smaller than a calculated power of the preamble.

11. A wireless device comprising:
    one or more processors; and
    memory storing instructions that, when executed by the one or more processors, cause the wireless device to:
        receive, by a wireless device, a grant indicating radio resources for transmission of a transport block via a first cell, wherein the radio resources overlap in time with a configured transmission of a preamble via a second cell;
        adjust, based on a power priority of the preamble, a transmission power of one of the preamble or the transport block, wherein the power priority of the preamble is:
            higher than a power priority of the transport block based on the second cell being a primary cell; and
            lower than the power priority of the transport block based on the second cell being a secondary cell; and
        transmitting the transport block via the radio resources.

12. The wireless device of claim 11, wherein the instructions, when executed by the one or more processors, further cause the wireless device to receive one or more messages comprising configuration parameters for a plurality of logical channels comprising a first logical channel, wherein the configuration parameters indicate:

a first logical channel priority for the first logical channel; and a mapping of the first logical channel to one or more transmission durations.

13. The wireless device of claim 12, wherein the instructions, when executed by the one or more processors, further cause the wireless device to multiplex data from the first logical channel into the transport block.

14. The wireless device of claim 11, wherein the adjustment is in response to a calculated total transmission power being above a value.

15. The wireless device of claim 14, wherein the calculated total transmission power is a sum of calculated power levels of a plurality of signals comprising the transport block.

16. The wireless device of claim 15, wherein a first signal in the plurality of signals is transmitted via a physical uplink control channel.

17. The wireless device of claim 15, wherein a second signal in the plurality of signals is transmitted via a physical random access channel.

18. The wireless device of claim 11, wherein the adjustment of the transmission power comprises the instructions, when executed by the one or more processors, further causing the wireless device to adjusting the transmission power of the preamble based on the second cell being the secondary cell.

19. The wireless device of claim 11, wherein an adjusted transmission power of the preamble is zero.

20. A system comprising:
a base station comprising:
  one or more first processors; and
first memory storing first instructions that, when executed by the one or more first processors, cause the base station to transmit a grant indicating radio resources for transmission of a transport block via a first cell, wherein the radio resources overlap in time with a configured transmission of a preamble via a second cell; and
a wireless device comprising:
  one or more second processors; and
  second memory storing second instructions that, when executed by the one or more second processors, cause the wireless device to:
  receive the grant;
  adjust, based on a power priority of the preamble, a transmission power of one of the preamble or the transport block, wherein the power priority of the preamble is:
    higher than a power priority of the transport block based on the second cell being a primary cell; and
    lower than the power priority of the transport block based on the second cell being a secondary cell; and
  transmitting the transport block via the radio resources.

* * * * *